(12) United States Patent
Takeuchi et al.

(10) Patent No.: US 9,081,652 B2
(45) Date of Patent: Jul. 14, 2015

(54) VEHICLE CONTROL SYSTEM

(75) Inventors: Keisuke Takeuchi, Susono (JP); Yoji Kanehara, Nagoya (JP); Toshio Tanahashi, Susono (JP); Yoshimitsu Agata, Susono (JP); Tomohide Kawasaki, Mishima (JP); Shin Noumura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 13/822,428

(22) PCT Filed: Sep. 13, 2011

(86) PCT No.: PCT/IB2011/002120
§ 371 (c)(1),
(2), (4) Date: Mar. 12, 2013

(87) PCT Pub. No.: WO2012/035401
PCT Pub. Date: Mar. 22, 2012

(65) Prior Publication Data
US 2013/0184934 A1 Jul. 18, 2013

(30) Foreign Application Priority Data
Sep. 15, 2010 (JP) ................. 2010-207208

(51) Int. Cl.
*B60W 30/00* (2006.01)
*B60W 30/188* (2012.01)
(Continued)

(52) U.S. Cl.
CPC ............ *G06F 17/00* (2013.01); *B60W 30/025* (2013.01); *B60W 30/182* (2013.01);
(Continued)

(58) Field of Classification Search
USPC .......... 701/37, 41, 110, 93, 74, 1, 29.4, 32.7, 701/45, 70; 180/170, 197, 167; 280/5.5, 280/5.507; 73/117.03
See application file for complete search history.

(56) References Cited

U.S. PATENT DOCUMENTS

2009/0024277 A1 1/2009 Poilbout
2009/0076682 A1 3/2009 Ghoneim
(Continued)

FOREIGN PATENT DOCUMENTS

JP A-6-249007 9/1994
JP A-2005-186674 7/2005
(Continued)

*Primary Examiner* — Adam Tissot
(74) *Attorney, Agent, or Firm* — Oliff PLC

(57) ABSTRACT

A vehicle control system includes: an acceleration acquisition unit that detects or estimates an acceleration of a vehicle; and a control unit that is configured to change a running characteristic, which includes at least any one of a driving force characteristic, shift characteristic, steering characteristic and suspension characteristic of the vehicle, on the basis of the acceleration, wherein the control unit is configured to relatively delay a change of the running characteristic for decreasing quickness of behavior of the vehicle with respect to a change of the running characteristic for increasing quickness of behavior of the vehicle, and is configured to limit a change of the running characteristic when a jerk, which is a time differential value of the acceleration, is larger than a limit determination threshold as compared with when the jerk is smaller than or equal to the limit determination threshold.

16 Claims, 11 Drawing Sheets

(51) Int. Cl.

| | |
|---|---|
| *B60W 30/19* | (2012.01) |
| *G06F 17/00* | (2006.01) |
| *B60W 30/02* | (2012.01) |
| *B60W 30/182* | (2012.01) |
| *B60W 50/00* | (2006.01) |
| *B60W 50/06* | (2006.01) |
| *F02D 41/04* | (2006.01) |
| *F02D 41/10* | (2006.01) |

(52) U.S. Cl.
CPC ........... *B60W 50/0098* (2013.01); *B60W 50/06* (2013.01); *F02D 41/045* (2013.01); *F02D 41/10* (2013.01); *B60W 2050/0095* (2013.01); *B60W 2520/10* (2013.01); *B60W 2520/105* (2013.01); *B60W 2520/125* (2013.01); *B60W 2720/106* (2013.01)

(56) References Cited

U.S. PATENT DOCUMENTS

2010/0121549 A1\* 5/2010 Fukuda et al. .................. 701/93
2012/0053789 A1\* 3/2012 Noumura et al. ............... 701/37

FOREIGN PATENT DOCUMENTS

| JP | A-2007-290650 | 11/2007 |
| JP | A-2009-508751 | 3/2009 |
| JP | A-2009-530166 | 8/2009 |
| WO | WO 2011/021084 A2 | 2/2011 |
| WO | WO 2011/021088 A1 | 2/2011 |
| WO | WO 2011/021089 A2 | 2/2011 |
| WO | WO 2011/021090 A2 | 2/2011 |
| WO | WO 2011/021634 A1 | 2/2011 |

\* cited by examiner

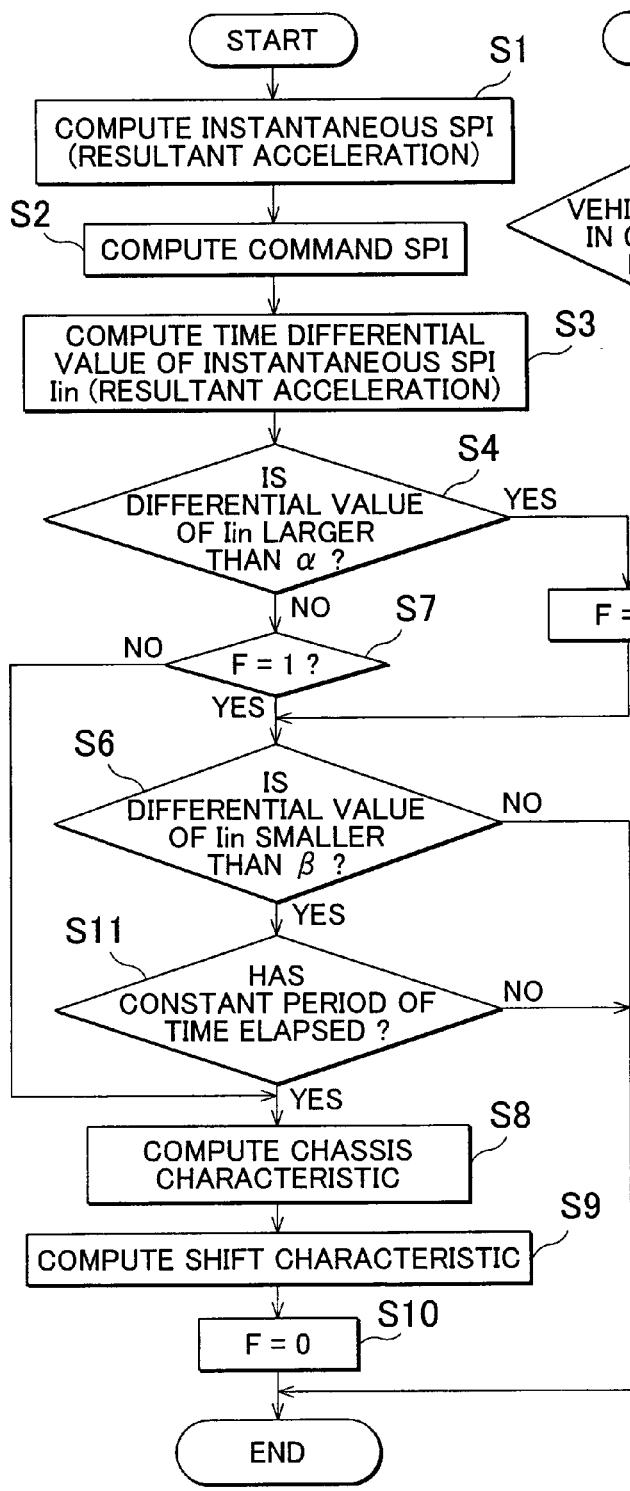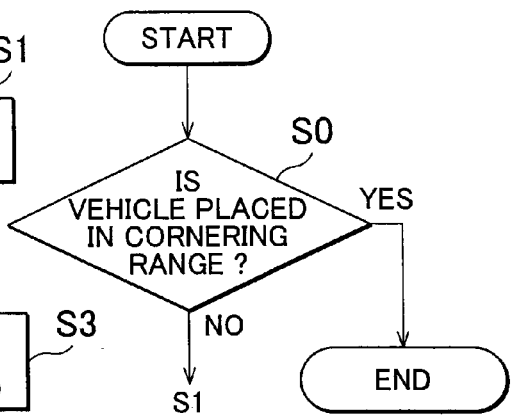

VEHICLE CONTROL SYSTEM

BACKGROUND OF THE INVENTION

1. Field of the Invention

The invention relates to a control system that controls a running characteristic, such as a driving force characteristic, a shift characteristic, a steering characteristic and a suspension characteristic, on the basis of the acceleration of a vehicle.

2. Description of Related Art

Driver's expectations and requests to a vehicle are various for each driver. Some drivers prefer running of a quick change in behavior (so-called sporty running), and others prefer smooth relaxed running (so-called mild running) on the contrary, so driver's tastes are various. In contrast to this, the running characteristic of a vehicle is predetermined in a design phase on the basis of the type of a vehicle, or the like, and may not always agree to a driver's driving orientation (or a driver's driving taste).

In an existing art, there have been various attempts to improve such disagreement between the running characteristic of a vehicle and the driving orientation of a driver as much as possible. For example, Japanese Patent Application Publication No. 06-249007 (JP-A-06-249007) describes a driving force control system that uses a neurocomputer. The driving force control system is configured to learn the correlation of an acceleration against an accelerator stroke and a vehicle speed as a required acceleration model and then compute a throttle opening degree on the basis of a deviation between the required acceleration model and a second reference acceleration model that incorporates a driving orientation and a deviation between the second reference acceleration model and a standard first reference acceleration model.

In addition, Japanese Patent Application Publication No. 2007-290650 (JP-A-2007-290650) describes a system that uses applied acceleration information to control the steering, acceleration or deceleration of a vehicle. The system is configured to start accelerating the vehicle when an applied lateral acceleration (that is, lateral jerk) is close to zero. Furthermore, Japanese Patent Application Publication No. 2005-186674 (JP-A-2005-186674) describes a system that is configured to estimate a driver's driving orientation on the basis of a jerk. Yet furthermore, Japanese Patent Application Publication No. 2009-508751 (JP-A-2009-508751) describes a system that controls suspensions on the basis of a longitudinal jerk and a lateral jerk. The system is configured to change the characteristic of each suspension on the basis of a longitudinal jerk and a lateral jerk. Then, Japanese Patent Application Publication No. 2009-530166 (JP-A-2009-530166) describes a system that is configured to evaluate a driver's driving style on the basis of the rate of variation in acceleration (that is, jerk) and then to set the operating state of a sub-system of a vehicle on the basis of the evaluated results.

JP-A-06-249007 describes that a driver's driving orientation, a driver's driving intention, or the like, is detected or estimated on the basis of the running condition of a vehicle and then the detected or estimated results are incorporated into control over the vehicle. In addition, there is known that a jerk, that is, the time differential value of an acceleration, is used in order to detect or estimate a driver's driving orientation, a driver's driving intention, or the like, as described in JP-A-2007-290650, JP-A-2005-186674, JP-A-2009-508751, JP-A-2009-530166, and the like. However, there is still room for improvement in better adapting the running characteristic to a driver's driving orientation or driver's driving intention or achieving higher drivability.

SUMMARY OF THE INVENTION

The invention provides a vehicle control system that is able to further accurately set a running characteristic on the basis of an acceleration.

A first aspect of the invention provides a vehicle control system. The vehicle control system includes: an acceleration acquisition unit that detects or estimates an acceleration of a vehicle; and a control unit that is configured to change a running characteristic, which includes at least any one of a driving force characteristic, shift characteristic, steering characteristic and suspension characteristic of the vehicle, on the basis of the acceleration, wherein the control unit is configured to relatively delay a change of the running characteristic for decreasing quickness of behavior of the vehicle with respect to a change of the running characteristic for increasing quickness of behavior of the vehicle, and is configured to limit a change of the running characteristic when a jerk, which is a time differential value of the acceleration, is larger than a limit determination threshold as compared with when the jerk is smaller than or equal to the limit determination threshold.

According to the first aspect of the invention, as the acceleration of the vehicle varies, the running characteristic is changed accordingly. The change of the running characteristic includes a change to increase the quickness of the behavior of the vehicle and a change to decrease the quickness. The latter change to decrease the quickness is relatively delayed with respect to the former change to increase the quickness. Then, any of these changes is also limited when the jerk is larger than the limit determination threshold. Thus, it is possible to avoid superimposed occurrence of the behavior of the vehicle in a state where the acceleration is varying by a relatively large amount.

Limiting a change of the running characteristic may include delaying a change of the running characteristic until the jerk is smaller than the limit determination threshold.

With the above configuration, the running characteristic is changed when the jerk is smaller than the limit determination threshold, so it is possible to incorporate a driver's driving orientation or driving intention that appears as an acceleration or the rate of variation in the acceleration over time into the running characteristic as much as possible. In addition, a variation in behavior resulting from a change of the running characteristic occurs in a state where a variation in the acceleration is stopped, so the driver easily recognizes a change of the running characteristic, and it is possible to achieve a crisp change of the running characteristic.

The acceleration may include a longitudinal acceleration in a longitudinal direction of the vehicle and a lateral acceleration in a lateral direction of the vehicle, and the control unit may be configured to change the running characteristic more easily on the basis of the longitudinal acceleration than on the basis of the lateral acceleration.

With the above configuration, a longitudinal acceleration resulting from braking, or the like, is better or more intensively incorporated into the running characteristic or a change of the running characteristic than a lateral acceleration to set the running characteristic, so the running characteristic may better incorporate a driver's driving orientation or driving intention.

The control unit may be configured to release a limitation on a change of the running characteristic at a larger jerk when a last local maximum value of the jerk is large than when the last local maximum value of the jerk is small.

Limiting a change of the running characteristic may include prohibiting a change of the running characteristic when the jerk is larger than the limit determination threshold.

With any one of the above configurations, a variation in the behavior of the vehicle resulting from a variation in acceleration is hard to overlap with a variation in behavior resulting from a change in running characteristic, so the driver easily recognizes the change of the running characteristic, and it is possible to achieve a crisp change of the running characteristic.

The running characteristic may include any two or more of the driving force characteristic, shift characteristic, steering characteristic and suspension characteristic of the vehicle, and the limit determination threshold may be set for each of the characteristics included in the running characteristic.

With the above configuration, the characteristics included in the running characteristic may be changed without any sense of strangeness.

The control unit may be configured to release a prohibition on a change of the running characteristic when the jerk decreases from a value larger than a predetermined allowable determination threshold to a value smaller than the allowable determination threshold, and the allowable determination threshold may be increased with an increase in a maximum value of the jerk in the case where the jerk is larger than the limit determination threshold.

With the above configuration, a variation in behavior resulting from a change of the running characteristic occurs in a state where a variation in acceleration is stopped, so the driver easily recognizes a change of the running characteristic, and it is possible to achieve a crisp change of the running characteristic.

The control unit may be configured to start changing the running characteristic after a lapse of a predetermined period of time from when the jerk decreases to the value smaller than the allowable determination threshold.

The predetermined period of time may be set on the basis of a maximum value of the jerk in the case where the jerk is larger than the limit determination threshold.

The running characteristic may include any two or more of the driving force characteristic, shift characteristic, steering characteristic and suspension characteristic of the vehicle, and the allowable determination threshold may be set for each of the characteristics included in the running characteristic.

The running characteristic may include any two or more of the driving force characteristic, shift characteristic, steering characteristic and suspension characteristic of the vehicle, and the predetermined period of time may be set for each of the characteristics included in the running characteristic.

With any one of the above configurations, a variation in the behavior of the vehicle resulting from a variation in acceleration is hard to overlap with a variation in behavior resulting from a variation in running characteristic, so the driver easily recognizes the change of the running characteristic, and it is possible to achieve a crisp change of the running characteristic.

The control unit may be configured to obtain an index on the basis of the acceleration, to change the running characteristic by varying the index and to limit a change of the running characteristic by prohibiting a variation in the index.

With the above configuration, the acceleration is replaced with an index, and control for changing or holding the running characteristic is executed on the basis of the index, so it is possible to improve diversity or flexibility of control in addition to the above described advantageous effects.

The acceleration may include a resultant acceleration that combines a longitudinal acceleration in a longitudinal direction of the vehicle and a lateral acceleration in a lateral direction of the vehicle, and the control unit may be configured to prohibit a change of a predetermined characteristic by which driving force of the vehicle is changed in a cornering range in which a rate of the lateral acceleration of the resultant acceleration is larger than or equal to a rate of the longitudinal acceleration of the resultant acceleration.

With the above configuration, a change of any one of the characteristics, such as a driving force characteristic and an accelerating characteristic, is prohibited in a state where the lateral acceleration is large, so it is possible to improve a crisp change of the running characteristic.

The control unit may be configured to, when a plurality of the characteristics included in the running characteristic are changed, change the characteristics at a time interval.

The control unit may be configured to, when a plurality of the characteristics included in the running characteristic are changed, change the characteristics in order of a running characteristic having a higher control response to a change of the running characteristic.

With any one of the above configurations, the order in which characteristics are changed, such as changing a suspension characteristic prior to a characteristic associated with driving force or a steering characteristic, may be set, so it is possible to further reliably exercise the advantageous effects of a change of each characteristic.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A and FIG. 1B are flowcharts for illustrating an example of control executed by a control system according to an embodiment of the invention;

DETAILED DESCRIPTION OF EMBODIMENTS

Figure 2:
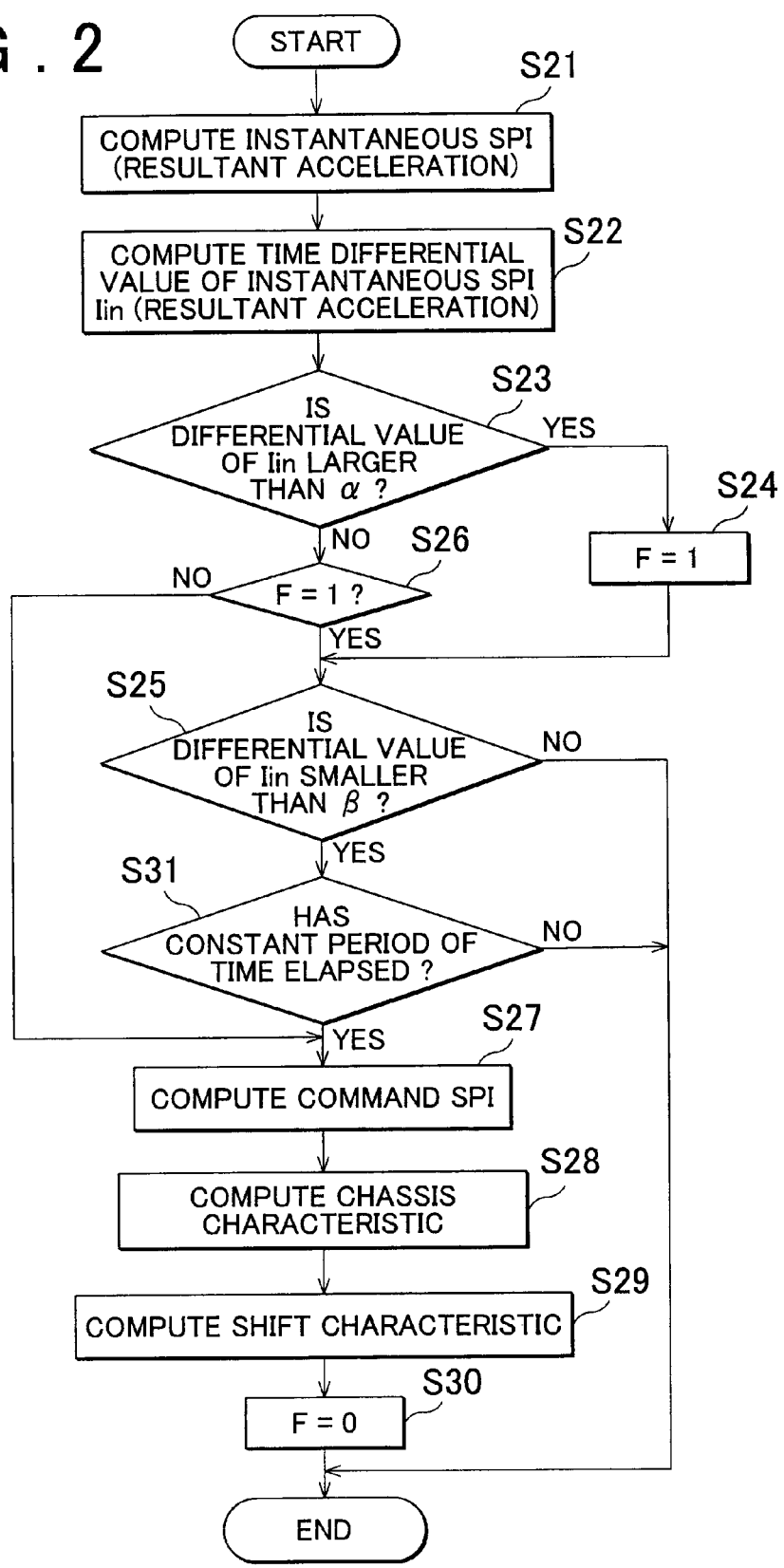
FIG. 2 is a flowchart for illustrating another example of control executed by the control system according to the embodiment of the invention.

An embodiment of the invention will be described with reference to specific examples. A vehicle to which a control system according to the embodiment of the invention is applied is a general vehicle that is configured so that the vehicle transmits power, output from a driving force source, to drive wheels to run and steers front wheels using a steering mechanism to turn and, in addition, brakes are respectively arranged at the wheels and a vehicle body is supported by a suspension mechanism. The driving force source may be formed of an internal combustion engine (engine), may be formed of an engine and a generator (that is, a motor generator) or may be formed of a motor.

In a vehicle that uses an engine as a driving force source, a step-gear or continuously variable transmission may be coupled to the output side of the engine. In addition, a so-called hybrid vehicle that includes both an engine and a generator as a driving force source may be configured so that the engine and the generator are coupled to a power split mechanism having a differential function, such as a planetary gear mechanism, and the rotational speed of the internal combustion engine is controlled on the basis of the rotational speed of the generator. Furthermore, in a vehicle that uses a motor as a driving force source, a transmission may be coupled to the output side of the motor where necessary.

In addition, the control system according to the embodiment of the invention is configured to change the details of control over steering made by a steering mechanism, the details of control over braking made by the brakes and the details of control over support of the vehicle body provided by the suspension mechanism together with control over a drive line, such as an engine and a transmission, on the basis of the running condition (more specifically, acceleration) of the vehicle. These mechanisms operate so as to change the behavior of the vehicle, so the control system according to the embodiment of the invention is configured to change the behavior characteristic on the basis of the running condition (that is, acceleration) of the vehicle. The running characteristic includes a driving force characteristic provided by the driving force source and the brakes, a shift characteristic of the transmission, a steering characteristic, turning characteristic and power assist characteristic provided by the steering mechanism, a suspension characteristic and damper characteristic provided by the suspension mechanism, and the like. In the following description, the "running characteristic" may collectively mean these characteristics.

The control system according to the embodiment of the invention is configured to control the running characteristic on the basis of the acceleration of the vehicle. The acceleration includes a longitudinal acceleration, a lateral acceleration and a resultant acceleration that combines these longitudinal and lateral accelerations. In addition, the acceleration not only includes an actual acceleration detected by a sensor but also an estimated acceleration obtained from an operation amount, such as an accelerator operation amount, a brake operation amount and a steering wheel operation amount. Furthermore, the control system according to the embodiment of the invention may be configured to control the running characteristic directly on the basis of the above acceleration; instead, the control system may be configured to control the running characteristic on the basis of a predetermined index obtained from the acceleration.

Figure 3:
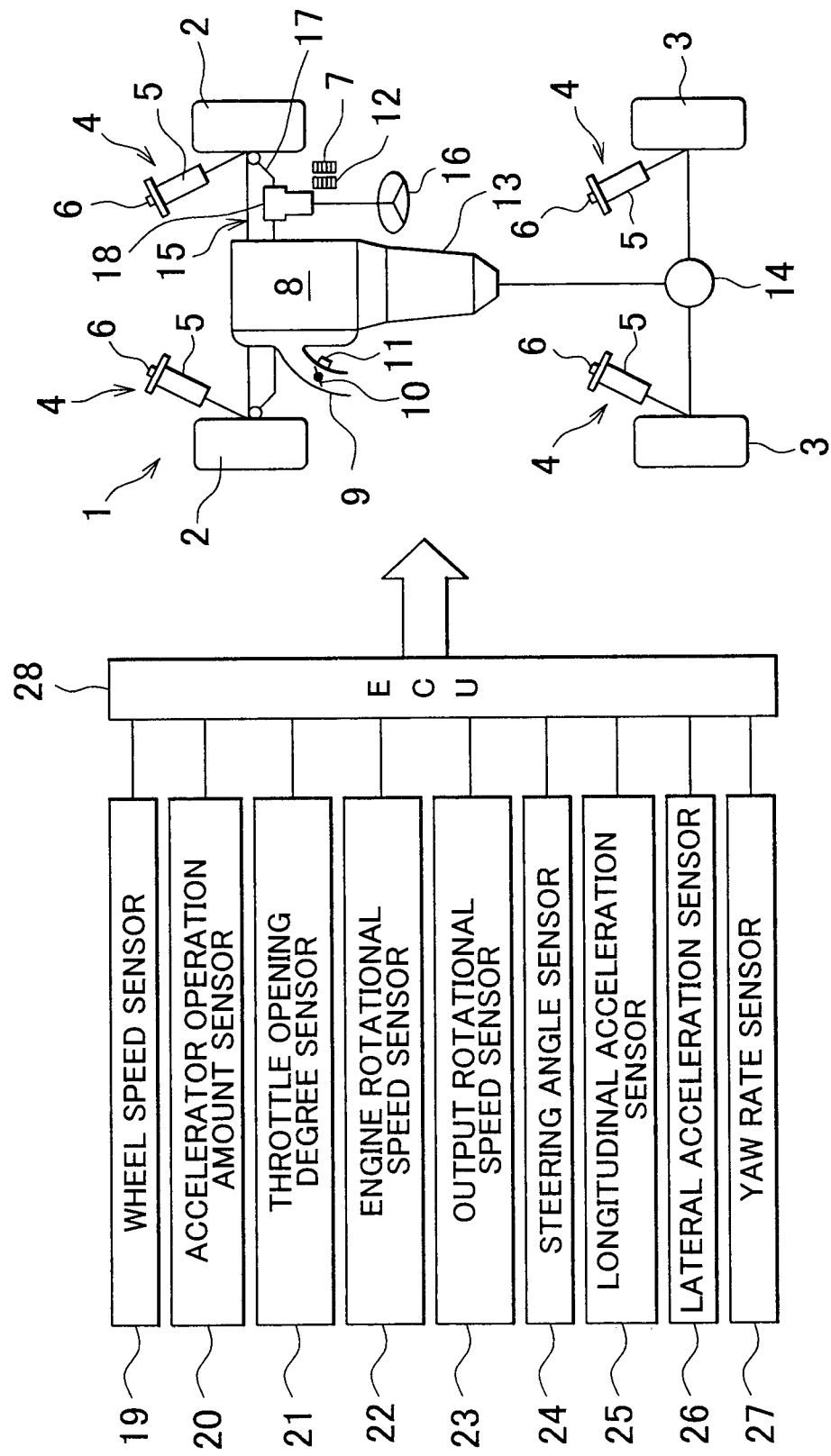
FIG. 3 is a view that schematically shows a vehicle to be controlled according to the embodiment of the invention.

Hereinafter, the control system according to the embodiment of the invention will be more specifically described. First, FIG. 3 schematically shows an example of a vehicle to be controlled according to the embodiment of the invention. The vehicle 1 illustrated here accelerates, decelerates or turns by driver's operation. A typical example of the vehicle 1 is an automobile that uses an internal combustion engine or a motor as a driving force source. That is, the vehicle 1 includes four wheels consisting of two steered front wheels 2 and two driving rear wheels 3. Each of these four wheels 2 and 3 is assembled to a vehicle body (not shown) by a suspension device 4. Each suspension device 4, as well as a generally known suspension device, is principally formed of a spring and a shock absorber (damper). FIG. 3 shows the shock absorbers 5. Each shock absorber 5 causes cushioning action using the flow resistance of a fluid, such as gas and liquid, and is able to change the flow resistance by an actuator, such as a motor 6. When the flow resistance of each shock absorber 5 is increased, the vehicle body is hard to squat down and provides a so-called stiff characteristic, and the behavior of the vehicle becomes less comfortable and provides an increased sporty feel. Note that the vehicle 1 may be configured to adjust the vehicle height by supplying or drawing pressurized gas to or from these shock absorbers 5.

Brake devices (not shown) are provided for the respective front and rear wheels 2 and 3. The brake devices are operable to apply braking force to the respective front and rear wheels 2 and 3 when a brake pedal 7 arranged at a driver seat is depressed.

The driving force source of the vehicle 1 is a generally known driving force source, such as an internal combustion engine, a motor and a combination of them. FIG. 3 shows an example of the vehicle 1 equipped with an internal combustion engine (engine) 8. A throttle valve 10 for controlling an intake air flow rate is arranged in an intake pipe 9 of the engine 8. The throttle valve 10 is an electronic throttle valve. The throttle valve 10 is, for example, opened or closed by an electrically controlled actuator 11, such as a motor, to thereby adjust the opening degree. Then, the actuator 11 operates in accordance with a depression amount of an accelerator pedal 12 arranged at the driver seat, that is, an accelerator operation amount, to thereby adjust the throttle valve 10 to a predetermined opening degree (throttle opening degree).

The correlation between an accelerator operation amount and a throttle opening degree may be appropriately set. As the correlation between an accelerator operation amount and a throttle opening degree approaches a one-to-one correlation, the driver more strongly experiences a so-called direct feel and, therefore, the running characteristic of the vehicle becomes a sporty characteristic. In contrast, when the characteristic is set so that the throttle opening degree becomes relatively low against the accelerator operation amount, the running characteristic of the vehicle becomes a so-called mild characteristic. When the motor is used as a driving force source, a current controller, such as an inverter and a converter, is provided instead of the throttle valve 10. Then, the current controller is configured to adjust supplied current in accordance with an accelerator operation amount and to appropriately change the correlation of a current value with respect to an accelerator operation amount, that is, the running characteristic.

A transmission 13 is coupled to an output side of the engine 8. The transmission 13 is configured to appropriately change the ratio between an input rotational speed and an output rotational speed, that is, a speed ratio. The transmission 13 is, for example, a generally known transmission, such as a step-gear automatic transmission, a belt-type continuously variable transmission and a toroidal-type continuously variable transmission. The transmission 13 includes an actuator (not shown). The transmission 13 is configured to change the speed ratio in a stepwise manner or continuously by appropriately controlling the actuator. Note that shift control over the transmission 13 is basically performed in order to set the speed ratio that provides high fuel efficiency. Specifically, a shift map that defines a speed ratio in correspondence with a state of the vehicle, such as a vehicle speed and an accelerator operation amount, is prepared in advance, and shift control is executed in accordance with the shift map. Alternatively, a target output is calculated on the basis of a state of the vehicle, such as a vehicle speed and an accelerator operation amount, a target engine rotational speed is obtained on the basis of the target output and an optimal fuel efficiency line, and then shift control is executed so as to attain the target engine rotational speed.

The transmission 13 is configured so as to be able to select fuel efficiency priority control or driving force increasing control over the above described basic shift control. Fuel efficiency priority control is control for upshifting at a relatively low vehicle speed or control for using a relatively high-vehicle-speed-side speed ratio (low speed ratio) at a low vehicle speed. In addition, driving force increasing control or accelerating characteristic increasing control is control for upshifting at a relatively high vehicle speed or control for using a relatively low-vehicle-speed-side speed ratio (high speed ratio) at a high vehicle speed. These controls may be executed, for example, in such a manner that a shift map is changed, a drive request amount is corrected or a calculated speed ratio is corrected. Note that a transmission mechanism, such as a torque converter equipped with a lock-up clutch, may be provided between the engine 8 and the transmission 13 where necessary. Then, an output shaft of the transmission 13 is coupled to the rear wheels 3 via a differential gear 14 that is a final reduction gear.

A steering mechanism 15 that steers the front wheels 2 will be described. The vehicle 1 includes a steering linkage 17 and an assist mechanism 18. The steering linkage 17 transmits the rotating motion of a steering wheel 16 to the right and left front wheels 2. The assist mechanism 18 assists the steering angle or steering force of the steering wheel 16. The assist mechanism 18 includes an actuator (not shown), and is able to adjust an assist amount assisted by the actuator. As the assist amount is reduced, the correlation between a steering force (or steering angle) and an actual turning force (or turning angle) of the front wheels 2 approaches a one-to-one correlation, and the driver experiences a so-called increased direct feel in steering, and the running characteristic of the vehicle becomes a so-called sporty characteristic.

Note that, although not specifically shown in the drawing, the vehicle 1 is equipped with an anti-lock brake system (ABS), a traction control system (TRC), a vehicle stability control system (VSC), and the like, for stabilizing the behavior or attitude. The vehicle stability control system (VSC) comprehensively controls these systems. These systems are generally known. These systems are configured to decrease braking force exerted on the wheels 2 and 3 or exert braking force on the wheels 2 and 3 on the basis of a deviation between a vehicle body speed and a wheel speed and, additionally, control engine torque at the same time, thus preventing or suppressing a lock or slip of the wheels 2 and 3 to stabilize the behavior of the vehicle. In addition, the vehicle may be provided with a navigation system that is able to obtain data in connection with a running road or a planned running road (that is, running environment) and/or a switch for manually selecting a running mode, such as a sporty mode, a normal mode and a low fuel consumption mode (eco mode). Furthermore, the vehicle may include a four wheel drive mechanism (4WD) that is able to change the running characteristic, such as hill-climbing characteristic, accelerating characteristic and a turning characteristic.

The vehicle 1 includes various sensors that acquire data for controlling the engine 8, the transmission 13, the shock absorbers 5 of the suspension devices 4, the assist mechanism 18, the above described systems (not shown), and the like. The sensors are, for example, a wheel speed sensor 19, an accelerator operation amount sensor 20, a throttle opening degree sensor 21, an engine rotational speed sensor 22, an output rotational speed sensor 23, a steering angle sensor 24, a longitudinal acceleration sensor 25, a lateral acceleration sensor 26, a yaw rate sensor 27, and the like. The wheel speed sensor 19 detects the rotational speed of each of the front and rear wheels 2 and 3. The output rotational speed sensor 23 detects the output rotational speed of the transmission 13. The longitudinal acceleration sensor 25 detects a longitudinal acceleration (Gx). The lateral acceleration sensor 26 detects the acceleration in the lateral direction (transverse direction) (lateral acceleration Gy). Note that the acceleration sensors 25 and 26 may be shared with an acceleration sensor used in vehicle behavior control, such as the above anti-lock brake system (ABS) and vehicle stability control system (VSC), and, in the vehicle equipped with an airbag, the acceleration sensors 25 and 26 may be shared with an acceleration sensor provided for controlling deployment of the airbag. Furthermore, the longitudinal and lateral accelerations Gx and Gy may be obtained in such a manner that a value detected by an acceleration sensor inclined at a predetermined angle (for example, 45°) with respect to the longitudinal direction of the vehicle along a horizontal plane is decomposed into a longitudinal acceleration and a lateral acceleration. Furthermore, instead of detecting the longitudinal and lateral accelerations Gx and Gy by a sensor, the longitudinal and lateral accelerations Gx and Gy may be computed on the basis of an accelerator operation amount, a vehicle speed, a road load, a steering angle, and the like. These sensors 19 to 27 are configured to transmit detected signals (data) to an electronic control unit (ECU) 28. The electronic control unit 28 is configured to compute in accordance with those pieces of data and pre-stored data and programs and then output the computed results to the above described systems or the actuators of those systems as control command signals. Note that it is not limited to use the resultant acceleration; it may be an acceleration in any one direction, such as only in the vehicle longitudinal direction, may be used.

The control system according to the embodiment of the invention is configured to incorporate the running condition (particularly, acceleration) of the vehicle into behavior control over the vehicle. Here, the acceleration of the vehicle is the running condition expressed by a longitudinal acceleration, a lateral acceleration, a yawing acceleration, a rolling acceleration or a resultant acceleration of some of these accelerations in the multiple directions. That is, when the vehicle is caused to run at a target speed or run in a target direction, or when the behavior of the vehicle, influenced by a running environment such as a road surface, is returned to an original state, accelerations in multiple directions usually occur. In consideration of this situation, a running environment or a driving orientation is conceivably incorporated in the running condition of the vehicle to some extent. On the basis of the above background, the control system according to the embodiment of the invention is configured to incorporate the acceleration of the vehicle into behavior control over the vehicle.

As described above, the behavior of the vehicle includes an accelerating characteristic, a turning characteristic, a support stiffness of the suspension devices 4 (that is, the degree of bump/rebound and the tendency of occurrence of bump/rebound), the degree of rolling, the degree of pitching, and the like. The control system according to the embodiment of the invention changes these running condition on the basis of the above running condition. The running characteristic may be changed by using an acceleration in any one of the directions or a resultant acceleration, which is an example of the above running condition; however, in order to further reduce a sense of strangeness, an index obtained by correcting values that indicate the running condition may be used.

As an example of the index, a sportiness index (SPI) will be described. Here, the sportiness index is an index that indicates a driver's intention or a running condition of a vehicle. The sportiness index in this embodiment is an index obtained by combining accelerations in multiple directions (particularly, absolute values thereof). The sportiness index is, for example, an acceleration that combines the longitudinal acceleration Gx and the lateral acceleration Gy as an acceleration significantly associated with the behavior in the running direction. For example, an instantaneous sportiness index Iin is calculated by the mathematical expression (1). Here, the acceleration is not limited to an acceleration detected by a sensor; it may be computed or estimated on the basis of a driver's operation, such as an accelerator operation amount, a steering angle, a brake depression force and a depression amount of the brake pedal. In addition, the "instantaneous sportiness index Iin" means an index that is calculated on the basis of accelerations in the respective directions at an interval of each moment during running of the vehicle, and is a so-called physical quantity. Note that the "interval of each moment" means each time of repetition when detection of accelerations and calculation of an instantaneous sportiness index Iin based on the detected accelerations are repeatedly executed at a predetermined cycle time.

$$Iin=(Gx^2+Gy^2)^{1/2} \quad (1)$$

In addition, within the longitudinal acceleration Gx used in the above mathematical expression (1), at least one of an accelerating acceleration (a positive acceleration) and a decelerating acceleration (a negative acceleration, that is, deceleration) is desirably normalized or weighted and then used. That is, in a general vehicle, the decelerating acceleration is larger than the accelerating acceleration; however, the difference is almost not experienced or recognized by the driver. In most cases, the driver recognizes that the accelerating and decelerating accelerations are almost equivalent to each other. Normalization is a process of correcting such a difference between an actual value and a feel experienced by the driver, and is a process of increasing the accelerating acceleration or decreasing the decelerating acceleration (that is, the deceleration) for the longitudinal acceleration Gx. More specifically, normalization is a process of obtaining the ratio between the maximum values of the respective accelerations and then multiplying the ratio by the accelerating or decelerating acceleration. Weighting is a process of correcting the decelerating acceleration for the lateral acceleration. In short, as in the case where longitudinal driving force and lateral force that can be generated in tires are represented by a tire friction circle, weighting is a correction process of, for example, weighting at least one of forward and rearward accelerations so that the maximum accelerations in the respective directions are placed on a circle of a predetermined radius. Through normalization and weighting, the degree of incorporation of the accelerating acceleration into the running characteristic is different from the degree of incorporation of the decelerating acceleration into the running characteristic. As one example of weighting, the decelerating acceleration and the accelerating acceleration are weighted so that, between the decelerating acceleration in the longitudinal direction of the vehicle and the accelerating acceleration in the longitudinal direction of the vehicle, the degree of influence of the accelerating acceleration is relatively larger than the degree of influence of the decelerating acceleration. Note that the lateral acceleration may be larger than the accelerating acceleration, so the lateral acceleration may also be subjected to normalization or weighting.

In this way, an actual acceleration and a feel experienced by the driver are different from each other depending on the direction of the acceleration. For example, there is conceivably such a difference between an actual acceleration and a feel experienced by the driver in an acceleration in the yawing direction, an acceleration in the rolling direction and a longitudinal acceleration. Then, in the embodiment of the invention, the control system is able to vary the degree of incorporation of each of accelerations in different directions into the running characteristic. In other words, the control system is able to vary the degree of a change in running characteristic based on an acceleration in any one of the directions from the degree of a change in running characteristic based on an acceleration in another direction. By way of example, the degree of incorporation of a deceleration into a change of the running characteristic is increased with respect to the degree of incorporation of a lateral acceleration.

Figure 4:
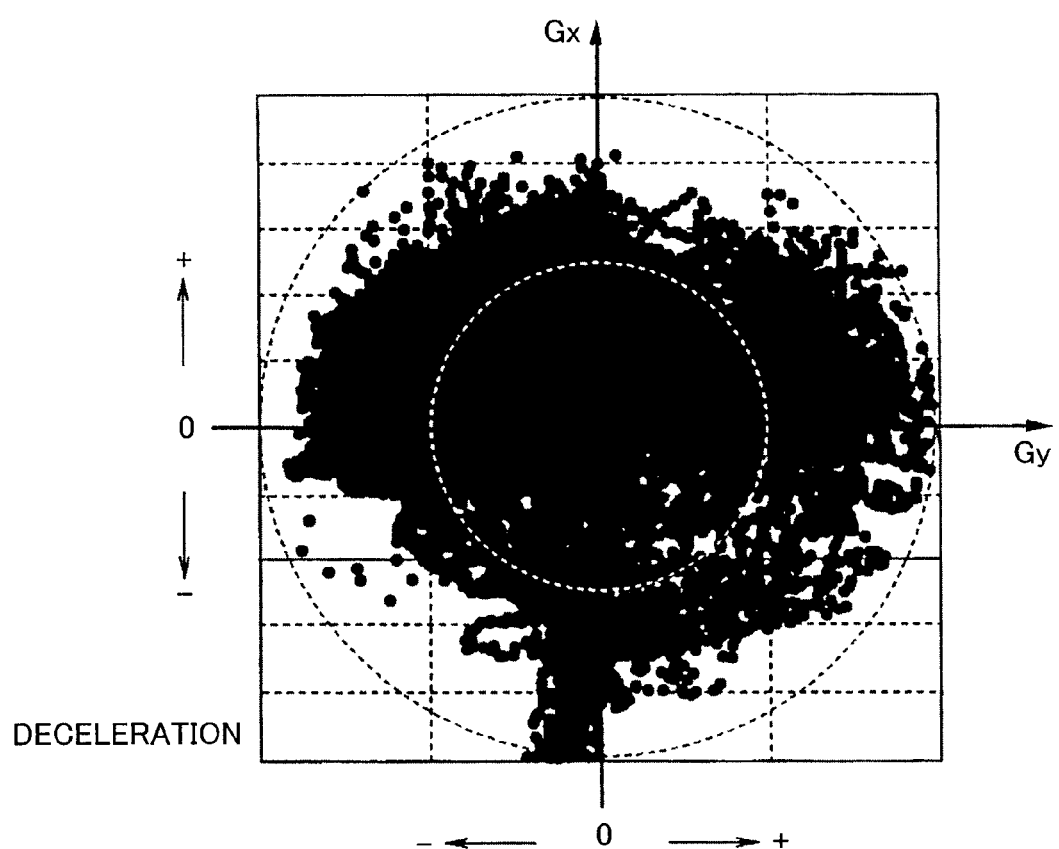
FIG. 4 is a graph that shows detected longitudinal accelerations and detected lateral accelerations that are plotted on a tire friction circle.

FIG. 4 shows an example of a tire friction circle on which the lateral accelerations Gy detected by the sensor and the normalized longitudinal accelerations Gx are plotted. This is an example when a vehicle runs on a test course that simulates an ordinary road. It appears that the frequency of an increase in lateral acceleration Gy is high when the vehicle significantly decelerates; however, both the longitudinal acceleration Gx and the lateral acceleration Gy generally tend to occur along the tire friction circle.

Figure 5:
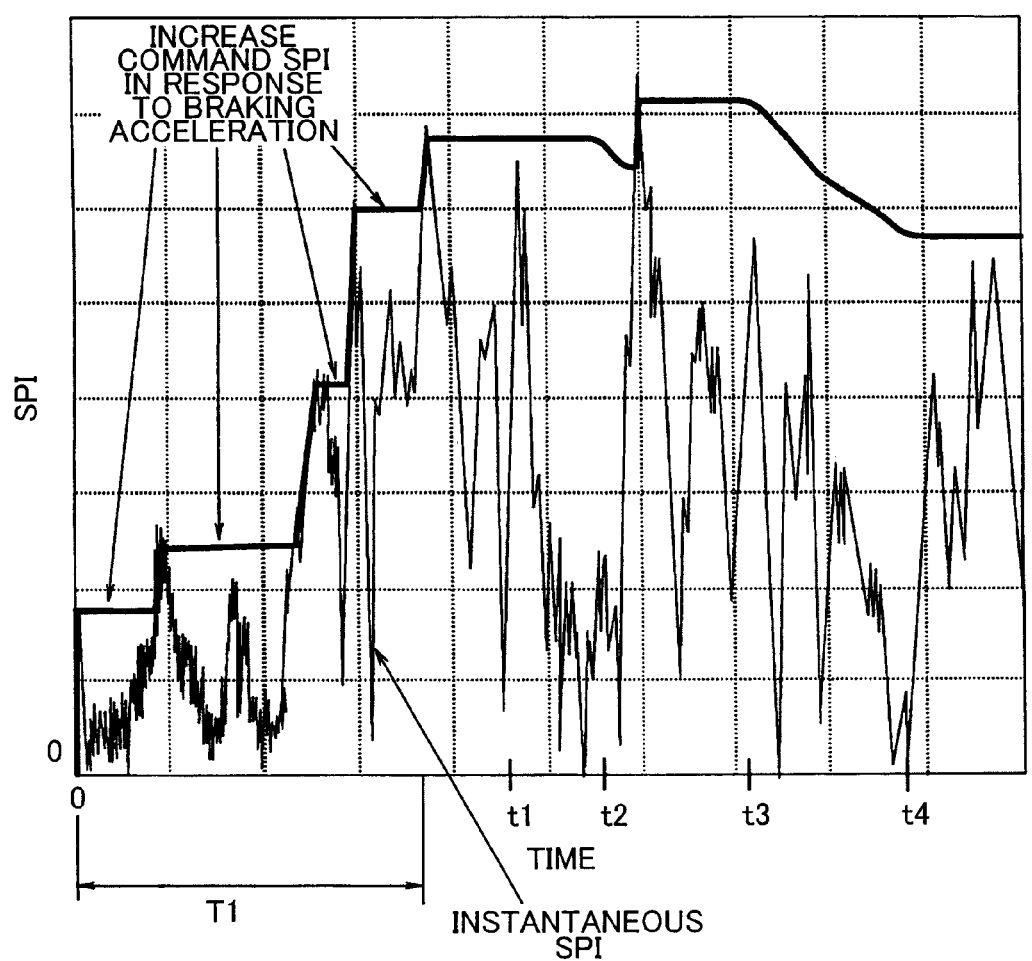
FIG. 5 is a graph that shows an example of a variation in a command sportiness index based on an instantaneous sportiness index.

In the control system according to the embodiment of the invention, a command sportiness index Iout is obtained from the above described instantaneous sportiness index Iin. The command sportiness index Iout is an index used in control for changing the running characteristic, and is configured to immediately increase with an increase in instantaneous sportiness index Iin that is a base for calculating the command sportiness index Iout and to contrarily decrease with a delay from a decrease in instantaneous sportiness index Iin (that is, resultant acceleration). Particularly, the command sportiness index Iout is configured to decrease when a predetermined condition is satisfied. FIG. 5 shows a variation in command sportiness index Iout obtained on the basis of a variation in instantaneous sportiness index Iin. In the example shown here, the instantaneous sportiness index Iin is indicated by values plotted in FIG. 4. On the other hand, the command sportiness index Iout is set at a local maximum value (last local maximum acceleration) of the instantaneous sportiness index Iin and is kept at the last value until a predetermined condition is satisfied. That is, the command sportiness index Iout is an index that quickly increases and relatively slowly decreases.

More specifically, for example, during a period T1 after a start of control in FIG. 5, when the vehicle brakes or turns, the instantaneous sportiness index Iin obtained by the variation in the acceleration increases or decreases; however, the instantaneous sportiness index Iin that is larger than the last local maximum value occurs before the above described predetermined condition is satisfied, so the command sportiness index Iout increases in a stepwise manner. In contrast, at t2 or t3, for example, when the vehicle shifts from acceleration during turning to acceleration during running straight ahead, the command sportiness index Iout decreases because a condition for decreasing the command sportiness index Iout is satisfied. In this way, in short, the condition for decreasing the command sportiness index Iout is satisfied if the command sportiness index Iout held at the last large value does not meet a driver's intention. In the specific example described here, it is determined that the condition for decreasing the command sportiness index Iout is satisfied on the basis of a lapse of time.

That is, the situation that the command sportiness index Iout held at the last large value does not meet a driver's intention is that a deviation between the held command sportiness index Iout and the instantaneous sportiness index Iin generated during then is relatively large and this situation is continuing and accumulating. Thus, the command sportiness index Iout is not decreased by the instantaneous sportiness index Iin caused by an operation that the driver temporarily returns the accelerator pedal 12 in the case where turning acceleration control is executed, or the like. On the other hand, the condition for decreasing the command sportiness index Iout is satisfied when it has been a predetermined period of time since the instantaneous sportiness index Iin, caused by an operation that the driver continuously returns the accelerator pedal 12 in the case where the vehicle gently decelerates, or the like, is lower than the command sportiness index Iout. In this way, the condition for decreasing the command sportiness index Iout may be a duration during which the instantaneous sportiness index Iin is lower than the command sportiness index Iout. In addition, in order to accurately incorporate an actual running condition into the command sportiness index Iout, it is applicable that the condition for decreasing the command sportiness index Iout is satisfied when a time integral value (or an accumulated value) of a deviation between the held command sportiness index Iout and the instantaneous sportiness index Iin reaches a predetermined threshold. Note that the threshold may be appropriately set by a driving test or simulation conducted in line with a driver's intention. When the latter time integral value of the deviation is used, the command sportiness index Iout is decreased in consideration of a period of time and a deviation between the command sportiness index Iout and the instantaneous sportiness index Iin, so control for changing the running characteristic into which an actual running condition or a behavior is further adequately incorporated is possible.

Note that, in the example shown in FIG. 5, a period of time during which the command sportiness index Iout is held up to t2 is longer than a period of time during which the command sportiness index Iout is held up to t3; however, this is because the following control is configured to be performed. That is, the command sportiness index Iout is increased and held at the last stage of the above described period T1 and, after that, the instantaneous sportiness index Iin increases at t1 before the above described condition for decreasing the command sportiness index Iout is satisfied, and then a deviation between the held command sportiness index Iout and the instantaneous sportiness index Iin is lower than or equal to a predetermined value. Note that the predetermined value may be appropriately set by a driving test or simulation conducted in line with a driver's intention or in consideration of a calculation error of the instantaneous sportiness index Iin. In this way, the fact that the instantaneous sportiness index Iin is close to the held command sportiness index Iout means that the running condition at that time is placed in the accelerating/decelerating condition and/or turning condition that causes the instantaneous sportiness index Iin based on which the held command sportiness index Iout is determined or in a condition close to that. That is, even when a certain period of time has elapsed after the time at which the command sportiness index Iout is increased to the held value, the running condition is approximate to the running condition at the time before a lapse of the period of time. Therefore, even when the instantaneous sportiness index Iin is lower than the command sportiness index Iout, the duration for satisfying the above described condition for decreasing the command sportiness index Iout is extended so as to hold the last command sportiness index Iout. Control or process for extending the duration may be performed in such a manner that the above described integral value (accumulated value) of an elapsed time or integral value of the deviation is reset and then accumulation of an elapsed time or integration of the deviation is resumed, the accumulated value or integral value is reduced by a predetermined amount, or accumulation or integration is interrupted for a constant period of time, or the like.

Figure 6:
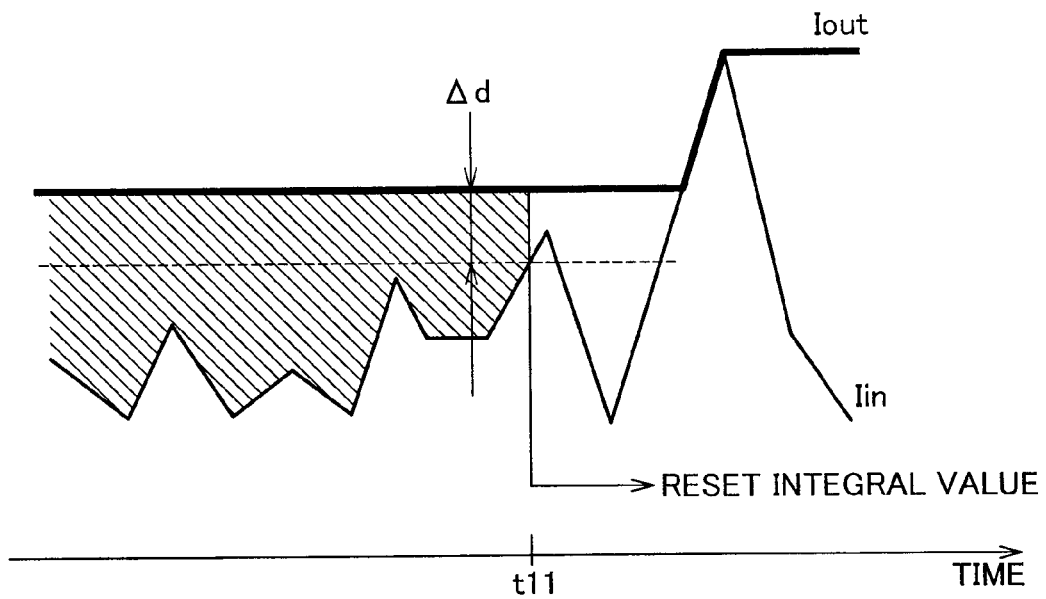
FIG. 6 is a graph for illustrating the time integral of a deviation between the instantaneous sportiness index and the command sportiness index and a situation in which the integral value is reset.

FIG. 6 is a schematic time chart of illustrating the above described integration of the deviation and the reset of the integral value. The hatched area in FIG. 6 corresponds to the integral value of the deviation. The integral value is reset at t11 at which a deviation between the instantaneous sportiness index Iin and the command sportiness index Iout is smaller than or equal to a predetermined value Δd and then integration of the deviation is started again. Thus, the condition for decreasing the command sportiness index Iout is not satisfied, so the command sportiness index Iout is kept at the last value. Then, after resuming integration, as the instantaneous sportiness index Iin becomes larger than the held command sportiness index Iout, the command sportiness index Iout is updated to the large value corresponding to the instantaneous sportiness index Iin, the updated command sportiness index Iout is held, and then the integral value is reset.

When it is determined whether the condition for decreasing the command sportiness index Iout is satisfied on the basis of the above integral value, the degree or inclination of decrease in command sportiness index Iout may be varied. The above described integral value is obtained by integrating a deviation between the held command sportiness index Iout and the instantaneous sportiness index Iin with respect to time. Therefore, when the deviation is large, the integral value reaches the predetermined value in a short period of time, and then the condition for decreasing the command sportiness index Iout is satisfied. On the other hand, when the deviation is small, the above described integral value reaches the predetermined value in a relatively long period of time, and then the condition for decreasing the command sportiness index Iout is satisfied. Therefore, when the condition for decreasing the command sportiness index Iout is satisfied in a short period of time, the amount of decrease in instantaneous sportiness index Iin with respect to the held command sportiness index Iout is large, so the command sportiness index Iout significantly deviates from the driver's intention at that point in time. Then, in such a case, the command sportiness index Iout is decreased at a large rate or a large inclination. In contrast, when a period of time elapsed until the condition for decreasing the command sportiness index Iout is satisfied is relatively long, the amount of decrease in instantaneous sportiness index Iin with respect to the held command sportiness index Iout is small, so the command sportiness index Iout may not significantly deviate from the driver's intention at that point in time. Then, in such a case, the command sportiness index Iout is slowly decreased at a small rate or a small inclination. By so doing, a deviation between the command sportiness index Iout for setting the running characteristic and a driver's intention is quickly and accurately corrected, and the running characteristic of the vehicle may be set so as to be adapted to the running condition. Thus, it is desirable that, when the command sportiness index Iout is decreased, the degree or inclination of decrease in command sportiness index Iout is varied in accordance with an elapsed time during which the command sportiness index Iout is held.

Incidentally, the control system according to the embodiment of the invention is configured to obtain an index on the basis of the acceleration and to set the running characteristic on the basis of the index. The acceleration may be a so-called actual acceleration obtained by a sensor; instead, the acceleration may be an estimated acceleration (or target acceleration) computed from a required driving amount, a vehicle speed, a braking operation amount, a steering angle, or the like. In addition, both an actual acceleration and a target acceleration may be used. When both an actual acceleration and a target acceleration are used, indices (a first index and a second index) are obtained in correspondence with the respective accelerations, those indices are compared with each other and then the index having a higher so-called sportiness index is employed. For example, a so-called actual instantaneous sportiness index Iin is obtained on the basis of an actual acceleration and an actual command sportiness index Iout is obtained on the basis of the actual instantaneous sportiness index Iin; whereas a so-called target instantaneous sportiness index Iin is obtained on the basis of a target acceleration and a target command sportiness index Iout is obtained on the basis of the target instantaneous sportiness index Iin. Then, the larger one of these actual command sportiness index Iout and target command sportiness index Iout is employed, and the running characteristic is set on the basis of the employed command sportiness index Iout. The correlation between the command sportiness index Iout and the running characteristic will be described later.

Furthermore, an example of an estimated acceleration that may be employed as the embodiment of the invention will be described as follows. Any one of the differential value of the input rotational speed of the transmission (T/M) 13, the differential value of the output rotational speed of the transmission (T/M) 13 and the differential value of a drive shaft rotational speed may be employed as a longitudinal acceleration. In addition, the longitudinal acceleration may be obtained on the basis of a variation in the position of a host vehicle, obtained from a global positioning system (GPS).

The above described command sportiness index Iout is determined from the instantaneous sportiness index Iin calculated on the basis of the actual acceleration or the estimated acceleration. As described above, the command sportiness index Iout indicates the running condition of the vehicle, and includes information about a running environment, such as a road surface gradient, the presence or absence of a corner and the curvature of the corner, and a driver's driving orientation. This is because the acceleration of the vehicle varies depending on the condition of a running road and an accelerating/decelerating operation is conducted by the driver on the basis of the condition of the running road and then the acceleration varies in accordance with the accelerating/decelerating operation. The control system according to the embodiment of the invention is configured to utilize the command sportiness index Iout for control over the running characteristic of the vehicle. In addition, the running characteristic in the embodiment of the invention includes a driving force characteristic, a shift characteristic, a steering characteristic, a suspension characteristic, a sound characteristic, and the like. These characteristics may be appropriately set in such a manner that the above described control characteristic of the throttle valve 10, the shift characteristic of the transmission 13, the damping characteristic of the shock absorber 5 of each suspension device 4, the assist characteristic of the assist mechanism 18, and the like, are changed by the associated actuators. Generally, the running characteristic is such that, as the command sportiness index Iout increases, the vehicle is able to achieve so-called more sporty running.

The running characteristic of the vehicle to be controlled according to the embodiment of the invention changes as the acceleration or the index based on the acceleration varies as described above. The behavior, such as the state of driving force of the vehicle and the state of turn of the vehicle, may vary with a variation in the running characteristic. On the other hand, the behavior of the vehicle also varies depending on a pedal operation, steering, or the like, of the driver. Variations in these behaviors are controlled in coordination with one another to thereby make it possible to achieve a crisp change in running characteristic and to improve drivability. Then, the control system according to the embodiment of the invention is configured to execute control descried below as an example.

FIG. 1A and FIG. 1B are flowcharts for illustrating the example of control. The example described here is configured so that the running characteristic is changed after a variation in the behavior of the vehicle resulting from a driver's operation becomes stable to thereby avoid a situation that a variation in behavior caused by a change of the running characteristic is superimposed on a variation in behavior caused by a driver's operation. When the example of control is specifically described, in the example shown in FIG. 1A, first, an instantaneous sportiness index Iin, that is, a resultant acceleration (resultant G), is computed (step S1). The instantaneous sportiness index Iin and computation of the instantaneous sports index Iin are already described above. Subsequently, a command sportiness index Iout is obtained on the basis of the instantaneous sportiness index Iin (step S2). The command sportiness index Iout, a method of obtaining the command sportiness index Iout and the way of decrease in the command sportiness index Iout are already described with reference to FIG. 5 and FIG. 6.

Furthermore, the time differential value of the acceleration (that is, jerk) is computed (step S3). In the example described here, a resultant acceleration of the longitudinal acceleration Gx and the lateral acceleration Gy is used as data that indicate the running condition of the vehicle, so the time differential value of the resultant acceleration is employed as a jerk. The jerk J is expressed by the following mathematical expression (2). It is determined whether the thus computed jerk (that is, the differential value of Iin) is larger than a predetermined prohibiting determination threshold α (step S4). The prohibiting determination threshold α is a lower limit jerk at which it is not desirable that a variation in acceleration is superimposed on a variation in behavior caused by a change of the running characteristic, and is predetermined by a running test, a simulation, or the like. Then, one prohibiting determination threshold α may be set for the overall running characteristic. Different from this configuration, the prohibiting determination threshold α may be set one by one for the driving force characteristic, the shift characteristic, the steering characteristic, the suspension characteristic (damper characteristic), and the like, that are included in the running characteristic and that define the running characteristic. In this case, the prohibiting determination threshold α is relatively reduced for the characteristic of which a variation is easily experienced by a passenger of the vehicle. By so doing, a variation in characteristic of which a variation is easily experienced while the acceleration is varying is further strictly limited. Furthermore, the above prohibiting determination threshold α may be a constant value or may be a variable that varies on the basis of another factor, such as a vehicle speed.

$$J=\{(dGx/dt)^2+(dGy/dt)^2\}^{1/2} \qquad (2)$$

When affirmative determination is made in step S4 because the jerk is larger than the above prohibiting determination threshold α, a flag F is set (step S5). That is, the flag F is set at "1". Subsequently, it is determined whether the jerk is smaller than an allowable determination threshold β (step S6). The allowable determination threshold β is used to evaluate a jerk when the jerk is decreased. More specifically, the allowable determination threshold β is used to determine whether the jerk is decreased to a degree to which a change of the running characteristic may be started. The allowable determination threshold β is used to determine the degree of jerk to which the behavior of the vehicle caused by a change of the running characteristic may be presumably superimposed on a variation in acceleration or to determine the control timing for changing the running characteristic so that a change of the running characteristic ends in a state where there is substantially no variation in acceleration. The allowable determination threshold β is predetermined by a running test, a simulation, or the like. Then, one allowable determination threshold β may be set for the overall running characteristic. Different from this configuration, the allowable determination threshold β may be set one by one for the driving force characteristic, the shift characteristic, the steering characteristic, the suspension characteristic (damper characteristic), and the like, that are included in the running characteristic and that define the running characteristic. In this case, the allowable determination threshold β is reduced for the characteristic of which a variation is easily experienced by a passenger of the vehicle. By so doing, a variation in characteristic of which a variation is easily experienced while the acceleration is varying is further strictly limited. Furthermore, the above allowable determination threshold β may be a constant value and may be, for example, a value close to zero. Instead, the allowable determination threshold β may be a value corresponding to a value (for example, maximum value) in the case where the jerk exceeds the above described prohibiting determination threshold α. Specifically, as the maximum value of the jerk increases, the allowable determination threshold β may be increased.

At the time or immediately after when the flag F is set at "1", the jerk is increased, so the jerk does not fall below the allowable determination threshold β and, therefore, negative determination is made in step S6. In this case, the routine shown in FIG. 1A once ends. That is, because the jerk exceeds the prohibiting determination threshold α, even when a large acceleration is applied and, as a result, the condition for changing the running characteristic is satisfied, a change of the running characteristic is limited or prohibited.

On the other hand, when negative determination is made in step S4, that is, when the jerk is lower than or equal to the prohibiting determination threshold α, it is determined whether the flag F is "1" (step S7). The jerk is lower than or equal to the prohibiting determination threshold α both in the case where the jerk does not exceed the prohibiting determination threshold α even when the jerk is increased and in the case where the jerk falls at or below the prohibiting determination threshold α after the jerk exceeds the prohibiting determination threshold α. In the former case, that is, when the jerk does not exceed the prohibiting determination threshold α, the flag F is not set at "1", so negative determination is made in step S7. In this case, the jerk has not exceeded the prohibiting determination threshold α immediately before. In this case, the chassis characteristic is computed (step S8), and the shift characteristic is computed (step S9). Note that these step S8 and step S9 are examples of computation of the running characteristic. After that, the process proceeds to step S10, and the flag F is set at "0", after which the routine of FIG. 1A once ends. Note that, when the jerk has not exceeded the prohibiting determination threshold α immediately before, the flag F is set at "0", so no control is executed in step S10. In this way, when the jerk is a small value such that the jerk is lower than or equal to the prohibiting determination threshold α, in other words, when a variation in acceleration is relatively small, the running characteristic is changed as usual on the basis of the acceleration. A specific example of changing or correcting the running characteristic will be described later.

On the other hand, when affirmative determination is made in step S7 because the flag F is set at "1", the process proceeds to step S6, and then it is determined whether the jerk is lower than the allowable determination threshold β. The allowable determination threshold β may be set as a value corresponding to the last maximum value (local maximum value) of the jerk as described above. In this case, the allowable determination threshold β may possibly be larger than the above described prohibiting determination threshold α. Even when the jerk starts to decrease but the jerk is still larger than or equal to the allowable determination threshold β, negative determination is made in step S6, after which the routine of FIG. 1A once ends. That is, the state of limiting or prohibiting a change of the running characteristic is maintained.

On the other hand, when the jerk falls below the allowable determination threshold β, affirmative determination is made in step S6, and, in this case, it is determined whether a constant period of time has elapsed (step S11). The constant period of time is an elapsed time from when affirmative determination is made in step S6. The constant period of time is a so-called a waiting time that is set so that control for changing the running characteristic, which will be started later, is started or ended in a state where the jerk is substantially zero. In order to achieve this purpose, the constant period of time may be predetermined by an experiment, a simulation, or the like. In addition, the constant period of time may be a constant value or may be a value set for each of a plurality of characteristics that define the running characteristic and in response to those characteristics, and, furthermore, may be a value corresponding to the last maximum value of the jerk. When negative determination is made in step S11, it means that the condition for releasing prohibitions (limitations) on a change of the running characteristic is not satisfied, so the routine of FIG. 1A once ends without executing any control.

On the other hand, when the constant period of time has elapsed and then affirmative determination is made in step S11, the process proceeds to step S8 and step S9, and then the running characteristic is changed. Note that, as described above, when the prohibiting determination threshold α or the allowable determination threshold β is provided for each of the plurality of characteristics included in the running characteristic, each characteristic is changed when the jerk falls below the allowable determination threshold β of that characteristic. In addition, when the allowable determination threshold β is set to a value corresponding to the last maximum value of the jerk, the start of a change of the running characteristic is advanced (so-called, forwarded). In addition, after the jerk falls below the allowable determination threshold β, the running characteristic is changed after a lapse of the constant period of time, so a change of the running characteristic is completed in a state where the jerk is substantially zero. In other words, the allowable determination threshold β or the constant period of time may be set so that a change of the running characteristic is completed in a state where the jerk is substantially zero.

Note that, in a state where the vehicle is cornering and the lateral acceleration is somewhat increased, it may be desirable that the running characteristic, such as a driving force characteristic and a shift characteristic, is not changed so as not to vary the behavior of the vehicle. In such a case, it is possible to prohibit a change of the running characteristic by determining a turn of the vehicle. Particularly, it is possible to prohibit a change of characteristics associated with driving force. The characteristics associated with driving force are a characteristic that defines a throttle opening degree against a depression amount of the accelerator pedal, a characteristic that sets a speed ratio of the transmission 13, and the like.

An example of control for prohibiting a change of the running characteristic in a cornering range will be described. In this case, for example, as shown in FIG. 1B, step S0 for determining whether the vehicle is placed in a cornering range is added before step S1. Then, when affirmative determination is made in step S0, the routine shown in FIG. 1B ends; whereas, when negative determination is made in step S0, the process proceeds to step S1 and the following steps shown in FIG. 1A. In addition, it may be determined whether the vehicle is placed in a cornering range on the basis of the running condition of the vehicle as follows. The cornering range is a range set on the tire friction circle shown in FIG. 4, and is a range in which the ratio of the component of the lateral acceleration Gy is relatively large within the accelerations that compose the resultant acceleration (instantaneous sportiness index Iin). For example, the cornering range is a range surrounded by lines that are located at 45°±5° on both sides from the abscissa axis (line of Gy) in FIG. 4. Note that the range is set at each of left and right sides. The range other than the cornering range on the tire friction circle is an accelerating/decelerating range, so the component of the lateral acceleration Gy in the cornering range is relatively larger than the component of the lateral acceleration Gy in the accelerating/decelerating range.

As described above, the control system according to the embodiment of the invention is able to set the prohibiting determination threshold α or the allowable determination threshold β for each of a plurality of characteristics included in the running characteristic. Thus, these values may be used to determine the order in which control for changing the characteristic is started or executed, and a time interval may be set to start or execute control for changing the characteristic. When the order or the time interval is set in this way, the chassis characteristic may be started or executed prior to the characteristics associated with driving force. Alternatively, the characteristics with a quick control response may be changed in advance. Note that, here, the characteristics to be controlled in the embodiment of the invention are, for example, a driving force characteristic for controlling the output power of the engine 8, a damper characteristic of the suspension mechanism, a stabilizer characteristic, a power steering characteristic of the steering mechanism, a differential characteristic, a vehicle height characteristic, an engine mount characteristic, a brake characteristic, an aerodynamic characteristic, a display characteristic associated with colors, such as display colors, a sound characteristic inside a vehicle cabin, and the like.

In the example shown in FIG. 1A and FIG. 1B, the command sportiness index Iout that is the index is obtained on the basis of the acceleration of the vehicle, and then the running characteristic is changed on the basis of the command sportiness index Iout; however, in the embodiment of the invention, the running characteristic may be directly changed or set on the basis of an acceleration (or resultant acceleration) without using the index, such as the command sportiness index Iout. That is, a correction value for the running characteristic may be obtained from an acceleration. On the other hand, when the running characteristic is changed on the basis of the command sportiness index Iout, instead of limiting or prohibiting a change of the running characteristic on the basis of a jerk, a change of the command sportiness index Iout is limited or prohibited to prohibit (wait) a change of the running characteristic until the jerk falls below the allowable determination threshold β.

An example of the above configuration is shown by the flowchart of FIG. 2. First, an instantaneous sportiness index Iin, that is, a resultant acceleration (resultant G), is computed (step S21), and then the time differential value (jerk) of the resultant acceleration is computed (step S22). These control processes are the same as those of step S1 and step S3 shown in FIG. 1A. Subsequently, it is determined whether the jerk is larger than a predetermined prohibiting determination threshold α (step S23). Determination in step S23 is performed as in the case of the determination in step S4 shown in FIG. 1A. When affirmative determination in step S23 is made in step S23 because the jerk is larger than the above described prohibiting determination threshold α, a flag F is set (step S24). That is, the flag F is set at "1". After that, it is determined whether the jerk is smaller than the above described allowable determination threshold β (step S25). Determination in step S25 is the same as the determination in step S6 shown in FIG. 1A.

At the time or immediately after when the flag F is set at "1", the jerk is increased, so the jerk does not fall below the allowable determination threshold β and, therefore, negative determination is made in step S25. In this case, the routine shown in FIG. 2 once ends. That is, because the jerk exceeds the prohibiting determination threshold α, even when a large acceleration (instantaneous sportiness index Iin) is applied and, as a result, a state in which the command sportiness index Iout is changed and, accordingly, the running characteristic is changed is satisfied, a change of the command sportiness index Iout or a change of the running characteristic accordingly is limited or prohibited.

On the other hand, when negative determination is made in step S23, that is, when the jerk is lower than or equal to the prohibiting determination threshold α, it is determined whether the flag F is "1" (step S26). The determination is the same as the determination in step S7 in the example shown in FIG. 1A. When negative determination is made in step S26, the command sportiness index Iout is computed (step S27), in addition, the chassis characteristic is computed (step S28), and furthermore the shift characteristic is computed (step S29). Note that these step S28 and step S29 are examples of computation of the running characteristic. After that, the process proceeds to step S30, and the flag F is set at "0", after which the routine of FIG. 2 once ends. Note that, when the jerk has not exceeded the prohibiting determination threshold α immediately before, the flag F is set at "0", so no control is executed in step S30. In this way, when the jerk is a small value such that the jerk is lower than or equal to the prohibiting determination threshold α, in other words, when a variation in acceleration is relatively small, the command sportiness index Iout and the running characteristic are changed as usual on the basis of the acceleration. Changing the command sportiness index Iout on the basis of the instantaneous sportiness index Iin is described with reference to FIG. 5, and a specific example of changing or correcting the running characteristic will be described later.

On the other hand, when affirmative determination is made in step S26 because the flag F is set at "1", the process proceeds to step S25, and then it is determined whether the jerk is lower than the allowable determination threshold β. The allowable determination threshold β may be set to a value corresponding to the last maximum value (local maximum value) of the jerk as described above, and, in this case, the allowable determination threshold β may be larger than the above described prohibiting determination threshold α. Even when the jerk starts to decrease but the jerk is still larger than or equal to the allowable determination threshold β, negative determination is made in step S25, and, in this case, the routine of FIG. 2 once ends. That is, a state of prohibiting a computation or change of the command sportiness index Iout and a change of the running characteristic is maintained.

On the other hand, when the jerk falls below the allowable determination threshold β, affirmative determination is made in step S25, and, in this case, it is determined whether a constant period of time has elapsed (step S31) as in the case of the control example shown in FIG. 1A. The constant period of time is described in the control example shown in FIG. 1A. When negative determination is made in step S31, it means that the condition for releasing prohibitions (limitations) on a change of the running characteristic is not satisfied, so the routine of FIG. 2 once ends without executing any control.

On the other hand, when the constant period of time has elapsed and then affirmative determination is made in step S31, the process proceeds to step S27, step 28 and step S29, and then the command sportiness index Iout is computed and changed and, accordingly, the running characteristic is changed. Note that the running characteristic is changed for each of the characteristics included in the running characteristic, and, for example, a change of the running characteristic is started or ended in a state where the jerk is substantially zero as in the case of the control example shown in FIG. 1A.

Figure 7:
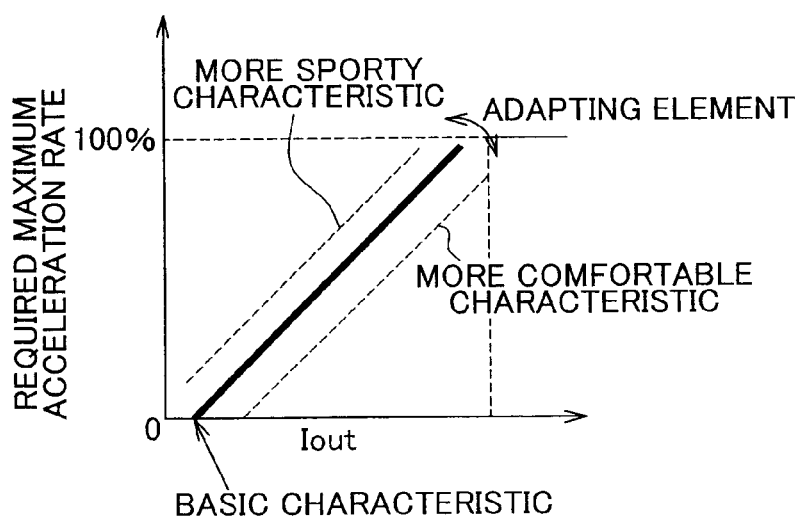
FIG. 7 is a map that shows the correlation between a command sportiness index and a required maximum acceleration rate.

Here, control for changing the running characteristic on the basis of an acceleration or a command sportiness index Iout will be described. First, an example of changing the accelerating characteristic on the basis of a command sportiness index Iout as an example of changing the running characteristic will be described. Initially, a required maximum acceleration rate is obtained in correspondence with the command sportiness index Iout set as described above. FIG. 7 shows an example of that. Here, the required maximum acceleration rate defines a margin driving force. For example, the required maximum acceleration rate 100% indicates a state where the potential maximum acceleration of the vehicle can be achieved, and means to set the transmission 13 at a speed ratio at which the engine rotational speed is maximal or the highest speed ratio (speed ratio at the lowermost vehicle speed side). In addition, for example, the required maximum acceleration rate 50% indicates a state where a half of the potential maximum acceleration of the vehicle can be achieved, and means to set the transmission 13 at an intermediate speed ratio. In the example shown in FIG. 7, as the command sportiness index Iout increases, the required maximum acceleration rate increases. The basic characteristic indicated by the solid line in FIG. 7 is obtained by calculating the correlation between a command sportiness index Iout and a required maximum acceleration rate on the basis of data acquired when the vehicle is actually caused to run, and includes appropriate corrections through actual vehicle running or a simulation. When a characteristic line is set on a side at which the required maximum acceleration rate is larger than that of the basic characteristic, the acceleration of the vehicle is relatively large, so the characteristic is a so-called sporty running characteristic or sporty accelerating characteristic. In contrast, when the characteristic line is set on a side at which the required maximum acceleration rate is smaller than that of the basic characteristic, the acceleration of the vehicle is relatively small, so the characteristic is a so-called comfortable running characteristic or comfortable accelerating characteristic. These adjustments (that is, adaptation or tuning) may be appropriately performed in accordance with salability required of the vehicle. Note that the reason why, in the basic characteristic, the required maximum acceleration rate becomes zero when the command sportiness index Iout is larger than zero is because a slight speed running condition, such as running in a traffic jam and putting the vehicle into a garage, is not incorporated into control for setting or changing the accelerating characteristic.

Figure 8:
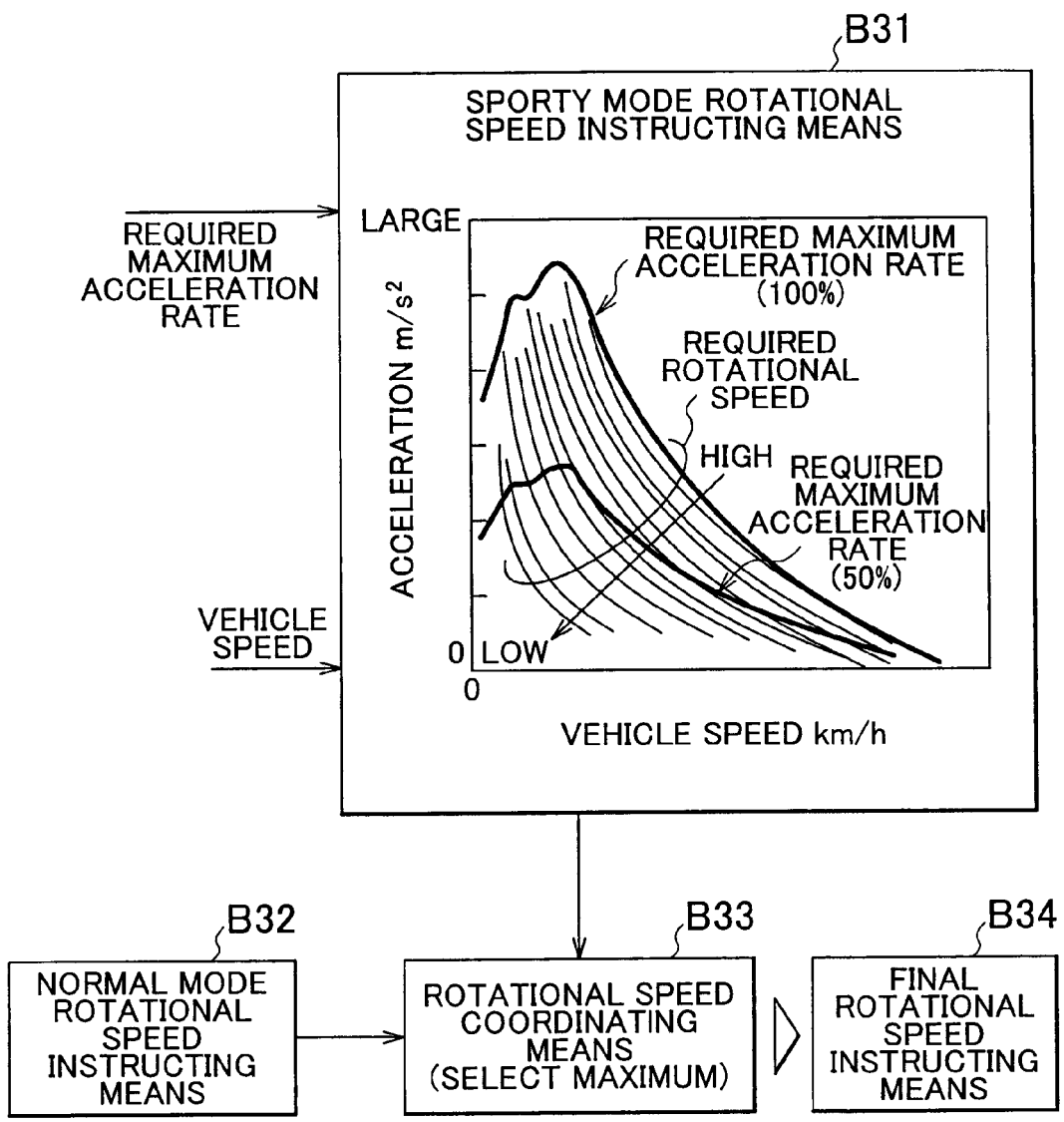
FIG. 8 is a graph that shows the correlation at each required rotational speed between a vehicle speed and an acceleration with a required maximum acceleration rate based on a command sportiness index and a view that illustrates a procedure by which a final command rotational speed is obtained on the basis of the graph.

Control for changing the accelerating characteristic by incorporating the above required maximum acceleration rate into the shift characteristic of the transmission 13 will be described. In the vehicle equipped with a continuously variable transmission as the transmission 13 or a hybrid vehicle that is able to control the engine rotational speed by a motor, a target output is calculated on the basis of a vehicle speed and a drive request amount, and then control is performed so as to attain the engine rotational speed that achieves the target output. The correlation at each required rotational speed between a vehicle speed and an acceleration is shown in FIG. 8. The required maximum acceleration rate obtained from the command sportiness index Iout on the basis of FIG. 7 is added to the correlation in FIG. 8. For example, the required maximum acceleration rates 100% and 50% are added and indicated by the wide solid lines in FIG. 8. Thus, a rotational speed indicated by a line that passes through an intersection of a line indicating a required maximum acceleration obtained from the command sportiness index Iout and a line indicating a vehicle speed at a current point in time is a required rotational speed.

The vehicle equipped with the transmission 13 and described with reference to FIG. 3 includes a basic shift map in order to control a speed ratio that is set by the transmission 13. For a continuously variable transmission, the shift map sets a speed ratio on the basis of a vehicle speed and an engine rotational speed. An example of the speed ratio control is generally known as torque demand control. For example, a required driving force is obtained from a driving force map on the basis of a vehicle speed and an accelerator operation amount that is a drive request amount, and then an output power required of the engine is obtained from the required driving force and a vehicle speed or an engine rotational speed. A target engine rotational speed at which the required output power is output at an optimal fuel efficiency is obtained on the basis of an engine rotational speed map, and then the speed ratio of the continuously variable transmission is controlled so as to achieve the target engine rotational speed. That is, the transmission 13 is caused to function as a rotational speed control mechanism for the engine that serves as the driving force source. Note that the output power of the engine is obtained by the product of a torque and a rotational speed, so an engine torque that achieves the required output power is obtained on the basis of the target engine rotational speed or a vehicle speed corresponding to the target engine rotational speed, and a throttle opening degree is calculated so as to attain the engine torque.

Sporty mode rotational speed instructing means B31 shown in FIG. 8 is means for providing instructions on a required rotational speed obtained on the basis of the above described command sportiness index Iout and may be regarded as sporty rotational speed calculation means. In addition, normal mode rotational speed instructing means B32 is means for providing instructions on a target rotational speed obtained through normal engine rotational speed control, such as torque demand control, and may be regarded as a normal rotational speed calculation means. The so-called normal mode rotational speed is compared (coordinated) with the so-called sporty mode rotational speed by rotational speed coordinating means B33, and the higher rotational speed between the normal mode rotational speed and the sporty mode rotational speed is selected. Such selection is called maximum selection. The thus selected rotational speed is output by final rotational speed instructing means B34 as a control signal. Thus, when the accelerator operation amount is small and, therefore, the normal mode rotational speed is lower than the sporty mode rotational speed, the sporty mode rotational speed is maintained. Note that, when the drive request amount increases to exceed the required maximum acceleration, such as when the accelerator pedal is depressed by a large amount, downshift is performed.

In the continuously variable transmission, such control is shift control toward a low vehicle speed side speed ratio (high speed ratio). As a result, as the speed ratio increases, a maximum driving force or an engine brake force increases, the behavior control over the vehicle becomes quick, and then the characteristic provides a so-called sporty feel or is appropriate for a driver's driving orientation or a running environment, such as a condition of a running road. Note that such control over the vehicle equipped with a continuously variable transmission may be configured so that a mode selection switch is provided and then the control is executed, for example, when a sporty mode is selected by the switch.

Figure 9:
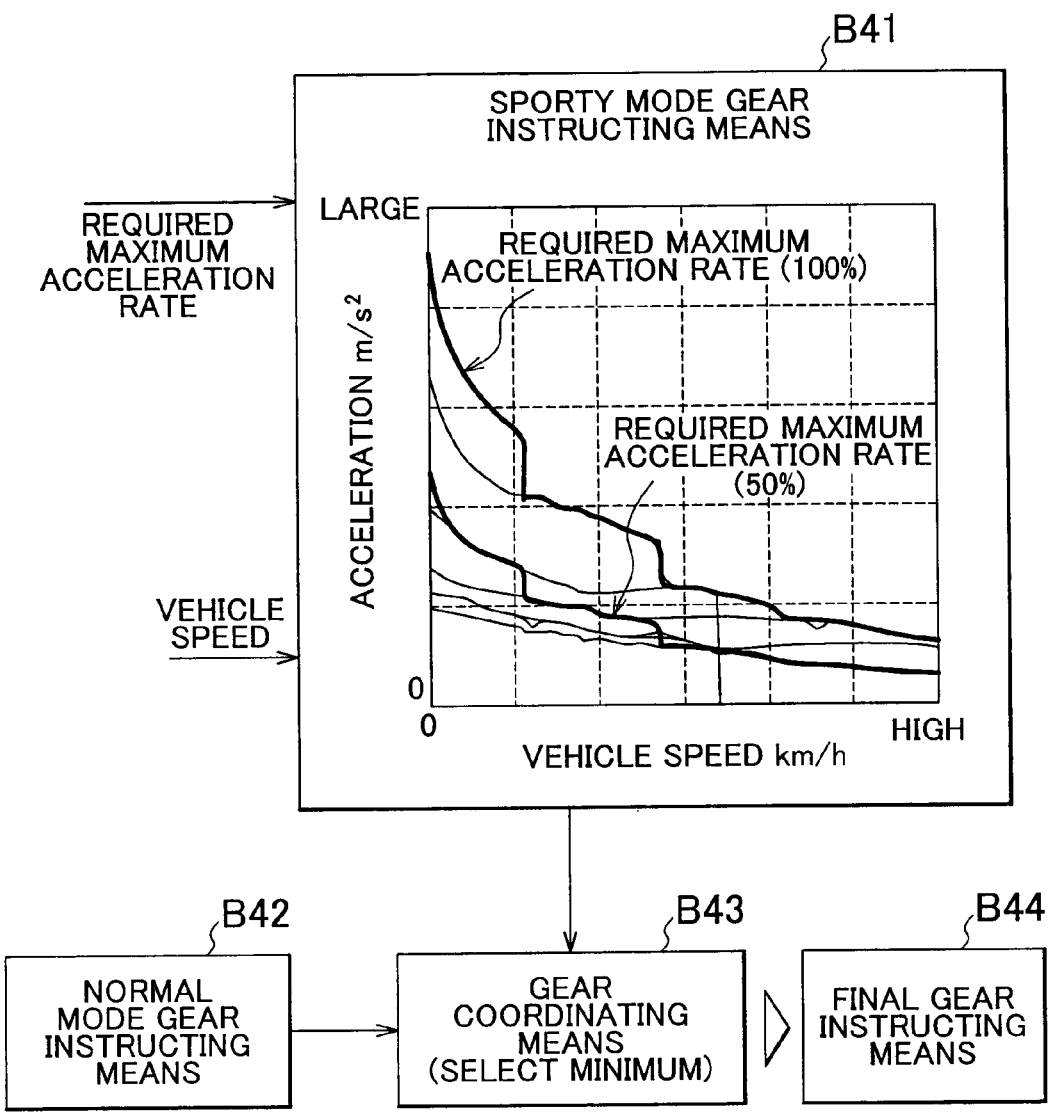
FIG. 9 is a graph that shows the correlation at each gear between a vehicle speed and an acceleration with a required maximum acceleration rate based on a command sportiness index and a view that illustrates a procedure by which a final command gear is obtained on the basis of the graph.

On the other hand, when the transmission 13 is a step-gear transmission, control is performed as shown in FIG. 9. In shift control over the step-gear transmission, a target gear is determined, and then a control command signal is output to an actuator of the transmission 13 so as to set the determined gear. Thus, the correlation at each gear between a vehicle speed and an acceleration is shown in FIG. 9. The lines of the required maximum accelerations 100% and 50% are added as the required maximum acceleration rates obtained from the command sportiness index Iout, and indicated by the wide solid lines in FIG. 9. Thus, a gear indicated by the line of a gear closest to an intersection between a line indicating the required maximum acceleration obtained from the command sportiness index Iout and a line indicating a vehicle speed at a current point in time is a target gear.

When control is executed by the control system according to the embodiment of the invention, the sporty target gear obtained from FIG. 9 is compared (coordinated) with a normal target gear (for example, speed ratio determined on the basis of an acceleration operation amount and a vehicle speed) based on a shift line map prepared in advance. Here, between the sporty target gear and the normal target gear, a low vehicle speed side gear having a higher speed ratio is selected. Such selection is called minimum selection. As a result, as the speed ratio increases, a maximum driving force or an engine brake force increases, and the behavior control over the vehicle becomes quick. That is, a normal target gear in the step-gear transmission is set on the basis of a shift line map (shift map) that defines the ranges of the respective gears by a vehicle speed and a drive request amount, such as an accelerator operation amount. Thus, when the drive request amount increases to exceed the required maximum acceleration, such as when the accelerator pedal is depressed by a large amount, downshift occurs. Then, as the vehicle speed increases, upshift is allowed.

As shown in FIG. 9, sporty mode gear instructing means B41 is means for providing instructions on a gear obtained on the basis of the above described command sportiness index Iout, and normal mode gear instructing means B42 is means for providing instructions on a gear obtained on the basis of a normal shift line map between an accelerator pedal operation amount and a vehicle speed. These so-called sporty mode gear and normal mode gear are compared (coordinated) with each other by gear coordinating means B43, and, between the sporty mode gear and the normal mode gear, a lower vehicle speed side gear (gear having a higher speed ratio) is selected (minimum selection). The thus selected gear is output by final gear instructing means B44 as a control signal. That is, the transmission 13 is caused to function as a rotational speed control mechanism for the engine that serves as the driving force source. Thus, when the normal mode gear is a higher vehicle speed side gear with respect to the sporty mode gear because of an accelerator operation amount, or the like, the sporty mode gear is maintained, and a lower vehicle speed side gear (higher speed ratio) is set.

In the step-gear transmission, such control is shift control toward a low vehicle speed side gear (high speed ratio). As a result, as the speed ratio increases, a driving force or an engine brake force increases, the behavior of the vehicle becomes quick, and then the characteristic provides a so-called sporty feel or is appropriate for a driver's driving orientation or a running environment, such as a condition of a running road. Note that such control may be configured so that a mode selection switch is provided and then the control is executed when a so-called sporty mode is selected by the switch or the control is prohibited when the sporty mode is not selected.

Note that the functions of the means shown in FIG. 8 or the functions of the means shown in FIG. 9 may be provided in the above described electronic control unit 28 or may be provided in another electronic control unit for sporty mode control.

Figure 10:
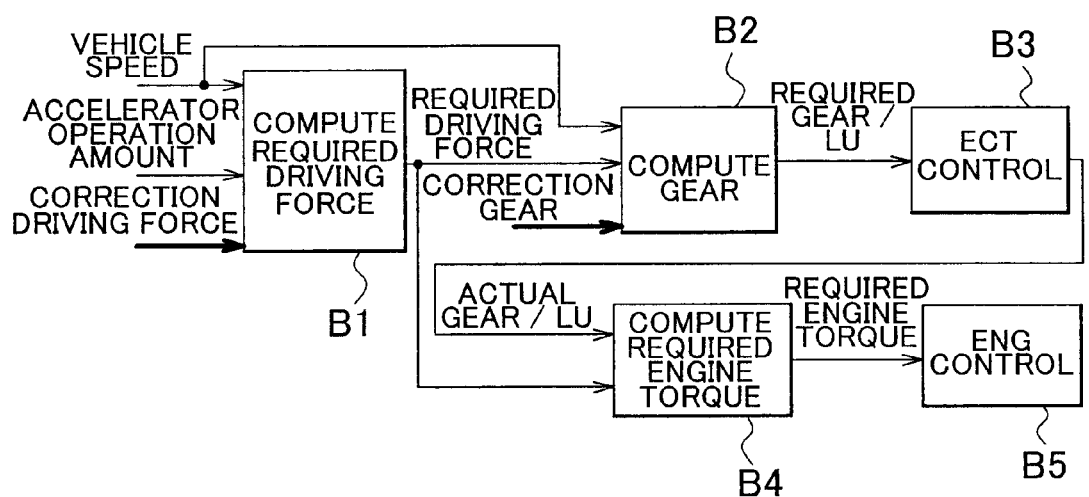
FIG. 10 is a block diagram of control that incorporates a correction gear and a correction driving force, which are obtained on the basis of a command sportiness index, into shift control and engine output control in a vehicle equipped with a step-gear automatic transmission.

Next, control for correcting a gear and a driving force and changing the running characteristic in accordance with the correction when the control system according to the embodiment of the invention is applied to the vehicle that includes an internal combustion engine as a driving force source and that is equipped with a step-gear transmission will be described. FIG. 10 is a block diagram that shows an example of obtaining a target gear and a target engine torque from a required driving force. In the basic configuration, first, a required driving force is computed from a vehicle speed and an accelerator operation amount (block B1). A required driving force is determined on the basis of a vehicle body weight, power performance imparted to the vehicle, and the like. Then, the computation in block B1 is performed in such a manner that a map that defines a required driving force in correspondence with a vehicle speed and an accelerator operation amount is prepared and then a required driving force is obtained on the basis of the map. Then, on the other hand, a gear is computed on the basis of the required driving force (block B2). Shift control over the step-gear transmission is performed on the basis of a shift line map that sets a gear region or upshift and downshift lines using a vehicle speed and a required driving force as parameters. Then, the computation of the gear in the block B2 is performed on the basis of the shift line map prepared in advance. The thus obtained required gear is output to a shift control device (ECT) B3 as a control command signal, and then shift control is executed in the transmission 13. Note that, when a lock-up clutch (LU) is provided in a power transmission path of the vehicle 1, it is determined whether to engage or release the lock-up clutch on the basis of a map prepared in advance, and a command signal for controlling the engagement or release of the lock-up clutch is also output.

On the other hand, a required engine torque is computed on the basis of the required driving force obtained in the block B1 and an actual gear of the transmission 13 (block B4). The engine rotational speed is determined on the basis of the gear and the vehicle speed, so a required engine torque may be computed on the basis of the engine rotational speed and the required driving force. The engine (ENG) 8 is controlled so as to generate the thus obtained required engine torque (block B5). Specifically, the throttle opening degree is controlled.

As described above, in the control system according to the embodiment of the invention, the command sportiness index Iout varies on the basis of the instantaneous sportiness index Iin, such as a longitudinal acceleration Gx, a lateral acceleration Gy and a resultant acceleration of the longitudinal acceleration Gx and the lateral acceleration Gy, and the required maximum acceleration varies accordingly. The required maximum acceleration is incorporated into shift control as described with reference to FIG. 9. When the gear determined on the basis of the command sportiness index Iout in the sporty mode is a lower vehicle speed side gear than the gear in the normal mode, the lower vehicle speed side gear becomes a final command gear. The basic configuration described with reference to FIG. 10 is to execute shift control in the normal mode, so, when the final command gear based on the command sportiness index Iout is a further lower vehicle speed side gear (corrected gear), the gear is acquired in the above block B2 and is then set as the required gear. As a result, a relatively higher speed ratio is set, so a maximum driving force or an engine brake force increases, the behavior control over the vehicle becomes quick, and then the characteristic provides a so-called sporty feel or is appropriate for a driver's driving orientation or a running environment, such as a condition of a running road.

In addition, in order to obtain an accelerating characteristic corresponding to the command sportiness index Iout, power output from the engine 8 may be increased or decreased. When such control is executed, a correction driving force is input in the above block B1 and then the required driving force determined on the basis of the above described basic configuration is increased or decreased on the basis of the correction driving force. Note that the correction driving force may be configured to be obtained on the basis of the above described command sportiness index Iout. For example, the correlation between a command sportiness index Iout and a correction driving force may be defined by an experiment or a simulation appropriate for a driver's intention and then the correlation may be prepared as data in form of a map, or the like, in advance and then the correction driving force may be obtained from the command sportiness index Iout obtained during running and the data of the correction driving force map, or the like.

Figure 11:
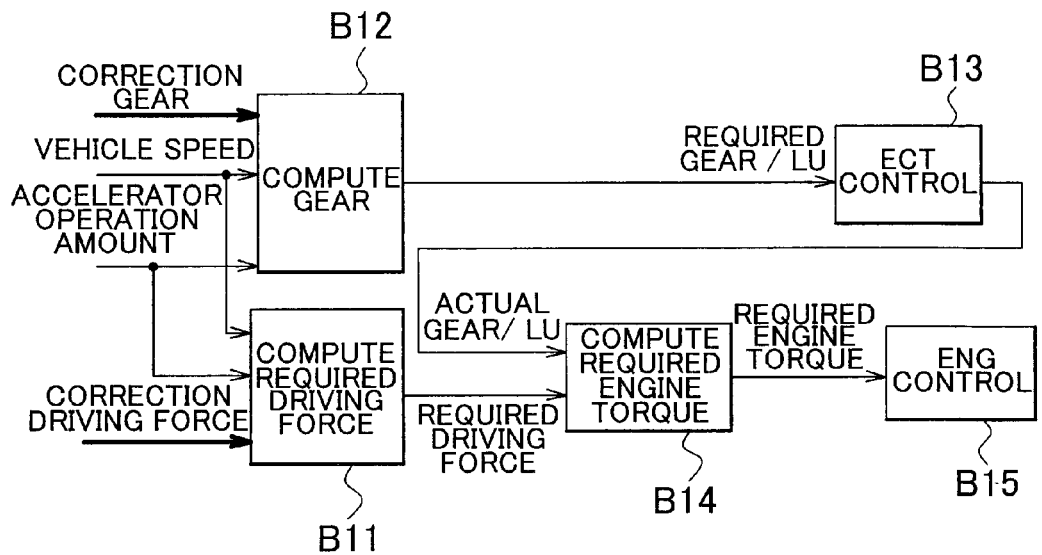
FIG. 11 is a block diagram of other control that incorporates a correction gear and a correction driving force, which are obtained on the basis of a command sportiness index, into shift control and engine output control in a vehicle equipped with a step-gear automatic transmission.

FIG. 11 shows an example in which a gear and a required driving force are obtained in parallel with each other from a vehicle speed and an accelerator operation amount. As described above, the speed ratio of the step-gear transmission is controlled on the basis of a vehicle speed and an accelerator operation amount by consulting a shift line map that defines gears or upshift and downshift lines. The gear is computed from a vehicle speed and an accelerator operation amount on one hand (block B12), and a required driving force is computed from the vehicle speed and the accelerator operation amount on the other hand (block B11). This computation of a required driving force is similar to the above described computation in the block B1 shown in FIG. 10.

The required gear determined in block B12 is transmitted to the shift control device (ECT) B13, and then shift control is executed in the transmission 13. Note that, when a lock-up clutch (LU) is provided in a power transmission path of the vehicle 1, it is determined whether to engage or release the lock-up clutch on the basis of a map prepared in advance, and a command signal for controlling the engagement or release of the lock-up clutch is also output.

On the other hand, the required engine torque is computed on the basis of the required driving force determined in the block B11 and an actual gear of the transmission 13 (block B14), and then the engine (ENG) 8 is controlled so as to generate the thus obtained required engine torque (block B15). The control in the block B14 is similar to the control in the block B4 shown in FIG. 10, and the control in the block B15 is similar to the control in the block B5 shown in FIG. 10.

In the configuration shown in FIG. 11 as well, when a final command gear based on the command sportiness index Iout is a further lower vehicle speed side gear (corrected gear), the gear is acquired in the block B12 and is then set as the required gear. As a result, a relatively high speed ratio is set, so the accelerating characteristic serving as the running characteristic of the vehicle increases. In addition, a correction driving force according to the command sportiness index Iout is input to the block B11, and the required driving force determined by the above described basic configuration is increased or decreased by the correction driving force.

Figure 12:
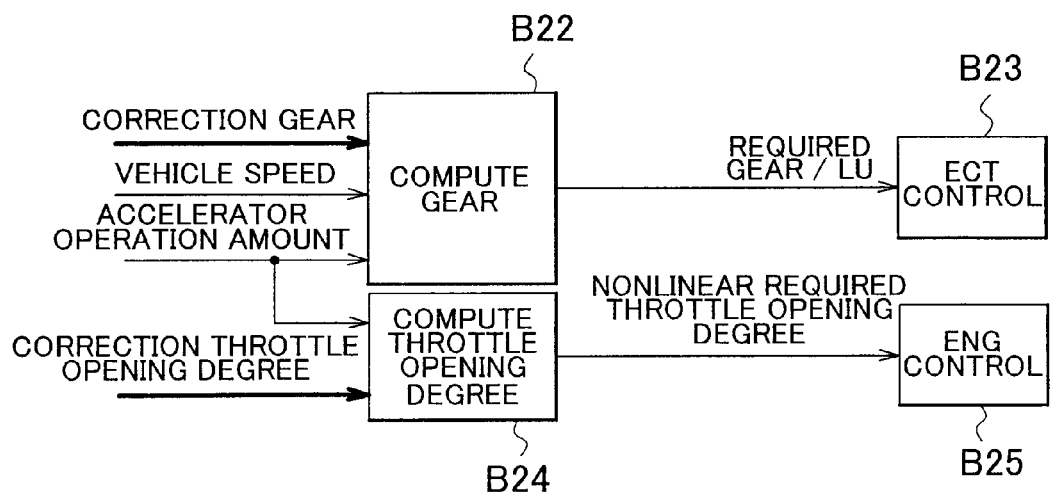
FIG. 12 is a block diagram of further other control that incorporates a correction gear and a correction driving force, which are obtained on the basis of a command sportiness index, into shift control and engine output control in a vehicle equipped with a step-gear automatic transmission.

Furthermore, FIG. 12 shows an example in which the transmission 13 and the engine 8 are independently controlled on the basis of a vehicle speed and an accelerator operation amount. That is, a gear is computed on the basis of a vehicle speed and an accelerator operation amount (block B22), the computed required gear is transmitted to the shift control device (ECT) B23, and then shift control is executed in the transmission 13. These controls are similar to the controls in the blocks B12 and B13 shown in FIG. 11. In addition, a throttle opening degree is computed on the basis of an accelerator operation amount (block B24), and the engine 8 is controlled in accordance with the required throttle opening degree (block B25). Note that, when an electronic throttle valve is provided, the correlation between an accelerator operation amount and a required throttle opening degree is generally nonlinear. That is, in a state where the accelerator operation amount is relatively small, a variation in throttle opening degree is small with respect to a variation in accelerator operation amount; whereas, when the accelerator operation amount is relatively large, the correlation between a variation in accelerator operation amount and a variation in throttle opening degree is close to a one-to-one relationship.

Even in the case where the basic configuration is configured as shown in FIG. 12, when a final command gear based on the command sportiness index Iout is a further lower vehicle speed side gear (corrected gear), the gear is acquired in the block B22 and is then set as the required gear. As a result, a relatively high speed ratio is set, so the accelerating characteristic serving as the running characteristic of the vehicle increases. In addition, a correction throttle opening degree corresponding to the command sportiness index Iout is input to the block B24, and the required throttle opening degree determined on the basis of the above described basic configuration is increased or decreased by the correction throttle opening degree. That is, it may be configured so that the output characteristic of the driving source is varied (for example, the driving force characteristic is increased) against accelerator operation when the command sportiness index Iout is high.

As described above, in the control system according to the embodiment of the invention, as the resultant acceleration increases on the basis of an intention of acceleration/deceleration, turning, or the like, in response to a driver's operation, such as when the accelerator pedal 12 is depressed for acceleration, when the brake pedal 7 is depressed for deceleration, when the steering wheel 16 is rotated for turning, or the like, the command sportiness index Iout immediately increases in accordance with an increase in the resultant acceleration. Then, a margin driving force increases in accordance with an increase in the command sportiness index Iout, and the running characteristic that allows so-called sporty running may be obtained. Then, the above operation is usually conducted by the driver in order to cause the vehicle to run in accordance with a running environment, such as the gradient of a running road, so, eventually, a driver's orientation or a running environment is incorporated in the changed running characteristic.

In addition, the factor that influences the running characteristic of the vehicle and that determines the running characteristic is not limited to control over the speed ratio as described above. The other factors include the output characteristic of engine torque against accelerator operation, steering characteristic that is the correlation of a turning angle of the front wheels with respect to a steering angle or steering force, the damping characteristic of vibrations or spring constant of each suspension device 4, the turning characteristic based on a torque distribution ratio between the front wheels and the rear wheels in a four wheel drive vehicle, and the like. The control system according to the embodiment of the invention may be configured to change these characteristics on the basis of an acceleration or an index that is determined from an acceleration. An example of changing the characteristics on the basis of the index will be described below. For example, the output power response of the engine 8 is set appropriately, that is, the rate of increase in throttle opening degree is set appropriately, assist torque provided by the assist mechanism 18 is set appropriately to provide an appropriate so-called direct feel, in addition, the gear ratio in the steering mechanism 15 is set appropriately, and a torque distribution amount to the rear wheels is set appropriately to provide appropriate turning performance, according to the above described command sportiness index Iout. Such controls for changing the characteristics may be performed by changing the output characteristics of actuators provided for the respective mechanisms.

Figure 13:
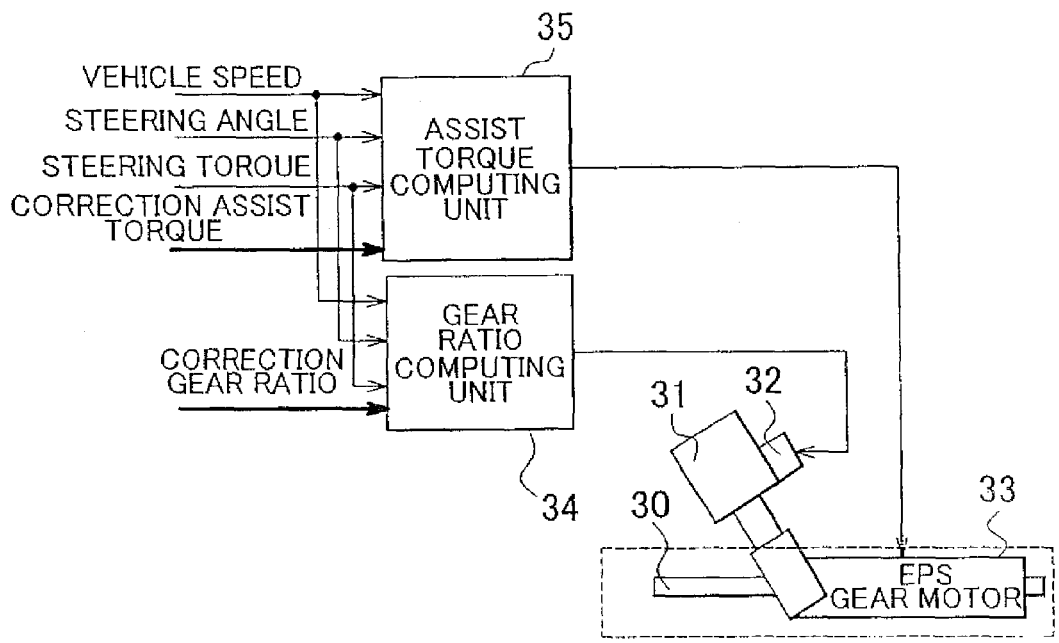
FIG. 13 is a block diagram of control that incorporates a correction gear ratio and a correction assist torque, which are obtained on the basis of a command sportiness index, into a steering characteristic.

Furthermore, the control system according to the embodiment of the invention may also be used when the steering characteristic, the suspension characteristic, or the like, which is one of the characteristics included in the running characteristic of the vehicle, other than when the accelerating characteristic or power characteristic of the vehicle is changed. FIG. 13 is a block diagram for illustrating control for changing the steering characteristic on the basis of the above described command sportiness index Iout, and schematically shows an electric power steering mechanism (EPS) that uses a variable gear ratio steering gear (VGRS gear). The EPS is provided with a rack 30 that receives steering force to thereby move back and forth in the transverse direction (lateral direction) of the vehicle. The rack 30 is in mesh with the gear of a VGRS gear unit 31. A VGRS actuator 32 for changing the gear ratio of the gear is assembled to the VGRS gear unit 31. In addition, the EPS is provided with an EPS gear motor 33 that assists movement of the rack 30 in a steered direction. Furthermore, the EPS includes a gear ratio computing unit 34 and an assist torque computing unit 35. The gear ratio computing unit 34 outputs a command signal to the VGRS actuator 32 to change the gear ratio. The assist torque computing unit 35 computes a torque to be output from the EPS gear motor 33 (thrust force applied to the rack 30) and then outputs the torque as a command signal. These transmission power steering mechanism and computing units may be the ones having generally known configurations.

The detected vehicle speed, the detected steering angle and the detected steering torque are input as data in the above computing units 34 and 35. These data may be acquired from sensors provided in correspondence with the vehicle speed, steering angle and steering torque. In addition to this, a correction gear ratio is input as data to the gear ratio computing unit 34. The correction gear ratio is used to correct a command signal to the VGRS actuator 32, and is configured to be set to a value corresponding to the command sportiness index Iout. Specifically, a map that defines a correction gear ratio in correspondence with a command sportiness index Iout may be prepared in advance and a correction gear ratio may be obtained from the map. The correlation between a command sportiness index Iout and a correction gear ratio may be appropriately defined where necessary.

On the other hand, a correction assist torque is input as data in the assist torque computing unit 35 in addition to the vehicle speed, steering angle and steering torque. The correction assist torque is used to correct a command signal to the EPS gear motor 33 and is configured to be set to a value corresponding to the command sportiness index Iout. Specifically, a map that defines a correction assist torque corresponding to a command sportiness index Iout may be prepared in advance, and an assist torque may be obtained from the map. The correlation between a command sportiness index Iout and a correction assist torque may be appropriately defined where necessary.

Thus, in the case of the configuration shown in FIG. 13, the gear ratio in the VGRS gear unit 31 is changed in accordance with the command sportiness index Iout obtained on the basis of accelerations occurring in the vehicle 1, and a torque that assists steering force is changed.

Figure 14:
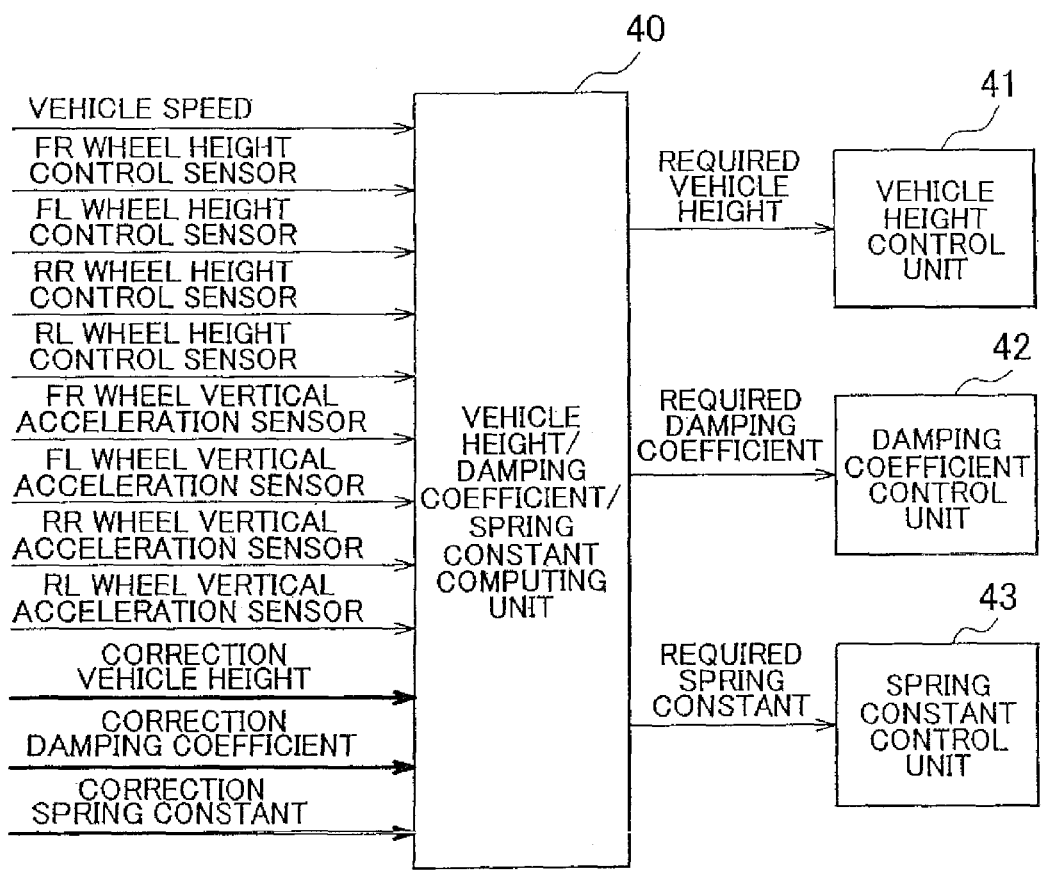
FIG. 14 is a block diagram of control that incorporates a correction vehicle height, a correction damping coefficient and a correction spring constant, which are obtained on the basis of a command sportiness index, into a suspension characteristic.

Furthermore, FIG. 14 is a block diagram for illustrating control for changing the suspension characteristic on the basis of the above described command sportiness index Iout, and shows an example that is configured to control the vehicle height, damping coefficient of vibrations and spring constant provided by a suspension mechanism (not shown). A computing unit 40 is provided to compute required values of these vehicle height, damping coefficient of vibrations and spring constant. The computing unit 40 is, for example, mainly formed of a microcomputer. The computing unit 40 is configured to compute using input data and prestored data to obtain a required vehicle height, a required damping coefficient and a required spring constant. For example, a vehicle speed, a signal detected by a front right (FR) wheel height control sensor, a signal detected by a front left (FL) wheel height control sensor, a signal detected by a rear right (RR) wheel height control sensor, a signal detected by a rear left (RL) wheel height control sensor, a signal detected by a front right (FR) wheel vertical acceleration sensor, a signal detected by a front left (FL) wheel vertical acceleration sensor, a signal detected by a rear right (RR) wheel vertical acceleration sensor, a signal detected by a rear left (RL) wheel vertical acceleration sensor, and the like, are the data. These detected signals are input to the computing unit 40 as data. These are similar to a generally known system.

Then, in the example shown in FIG. 14, a correction vehicle height, a correction damping coefficient and a correction spring constant are input as data for controlling the suspension characteristic. The correction vehicle height is data for correcting the vehicle height in accordance with the above described command sportiness index Iout. For example, a map that defines a correction vehicle height in correspondence with a command sportiness index Iout is prepared in advance, and then a correction vehicle height may be obtained from the map. In addition, the correction damping coefficient is data for correcting damping coefficients of devices that provide vibration damping function, such as the shock absorbers. For example, a map that defines a correction damping coefficient in correspondence with a command sportiness index Iout is prepared in advance, and a correction damping coefficient may be obtained from the map. The correction damping coefficient is increased as the command sportiness index Iout increases, and the suspension devices are set to have a so-called stiff characteristic. Similarly, the correction spring constant is data for correcting the spring constant in each suspension device. For example, a map that defines a correction spring constant in correspondence with a command sportiness index Iout is prepared in advance, and a correction spring constant may be obtained from the map. The correction spring constant is increased as the command sportiness index Iout increases, and the suspension devices are set to have a so-called stiff characteristic.

The computing unit 40 is configured to compute using the above described pieces of data, output the calculated required vehicle height to a vehicle height control unit 41 as a control command signal and then control the vehicle height so as to correspond to the command sportiness index Iout. Specifically, when the command sportiness index Iout is relatively large, the vehicle height is controlled to be relatively low. In addition, the computing unit 40 is configured to output the computed required damping coefficient to a damping coefficient control unit 42 as a control command signal and then control the damping coefficient so as to correspond to the command sportiness index Iout. Specifically, when the command sportiness index Iout is relatively large, the damping coefficient is controlled so as to be relatively large. Furthermore, the computing unit 40 is configured to output the computed required spring constant to a spring constant control unit 43 as a control command signal and then control the spring constant so as to correspond to the command sportiness index Iout. Specifically, when the command sportiness index Iout is relatively large, the spring constant is controlled so as to be relatively large.

In the embodiments described above, the control system is configured to prohibit the change of the running characteristic when the jerk is larger than prohibiting determination threshold α. However, the invention is not limited to these embodiments. The control system may be configured to limit a change of the running characteristic when the jerk is larger than a limit determination threshold as compared with when the jerk is smaller than or equal to the limit determination threshold. In the case where the running characteristic includes a plurality of characteristics, the limit determination threshold may be set for each of the characteristics. In addition, the limitation on the change of the running characteristic may be released at a larger jerk when a last local maximum value of the jerk is large than when the last local maximum value of the jerk is small. More specifically, in the case where the limitation on the change of the running characteristic is released if the jerk is decreased to a value smaller than a limit release threshold (the limit release threshold may be identical to the limit determination threshold), the limit release threshold may be increased with an increase in the last local maximum value of the jerk. Here, another example of limiting the change of the running characteristic may be delaying a change of the running characteristic until the jerk is smaller than the limit determination threshold. Further, in the case where the acceleration includes a longitudinal acceleration in a longitudinal direction of the vehicle and a lateral acceleration in a lateral direction of the vehicle, the control system may be configured to change the running characteristic more easily on the basis of the longitudinal acceleration than on the basis of the lateral acceleration.

The invention claimed is:

1. A vehicle control system comprising:
an acceleration acquisition unit that detects or estimates an acceleration of a vehicle; and
a control unit that is configured to change a running characteristic, which includes at least any one of a driving force characteristic, a shift characteristic, a steering characteristic and a suspension characteristic of the vehicle, based on the acceleration, wherein
the control unit is configured to relatively delay a change of the running characteristic for decreasing quickness of behavior of the vehicle with respect to a change of the running characteristic for increasing quickness of behavior of the vehicle, and is configured to limit a change of the running characteristic when a jerk, which is a time differential value of the acceleration, is greater than a limit determination threshold as compared with when the jerk is less than or equal to the limit determination threshold;
the control unit is configured to obtain an index based on the acceleration;
the control unit is configured to change the running characteristic such that quickness of behavior of the vehicle increases in accordance with an increase in the index and decreases in accordance with a decrease in the index; and
the index is configured to immediately increase with an increase in the acceleration and to decrease with a delay from a decrease in the acceleration.

2. The vehicle control system according to claim 1, wherein
limiting a change of the running characteristic includes delaying a change of the running characteristic until the jerk is less than the limit determination threshold.

3. The vehicle control system according to claim 1, wherein
the acceleration includes a longitudinal acceleration in a longitudinal direction of the vehicle and a lateral acceleration in a lateral direction of the vehicle, and the control unit is configured to change the running characteristic to a greater degree based on the longitudinal acceleration than based on the lateral acceleration.

4. The vehicle control system according to claim 1, wherein
the control unit is configured to cancel a limitation on a change of the running characteristic when the jerk is decreased to a value less than a limit release threshold, and
when the limit release threshold is increased with an increase in a last local maximum value of the jerk, the control unit is configured to cancel the limitation at a greater jerk than before the last local maximum was increased.

5. The vehicle control system according to claim 1, wherein
the running characteristic includes any two or more of the driving force characteristic, the shift characteristic, the steering characteristic and the suspension characteristic of the vehicle, and
the limit determination threshold is set for each of the characteristics included in the running characteristic.

6. The vehicle control system according to claim 1, wherein
limiting a change of the running characteristic includes prohibiting a change of the running characteristic when the jerk is greater than the limit determination threshold.

7. The vehicle control system according to claim 6, wherein
the control unit is configured to release a prohibition on a change of the running characteristic when the jerk decreases from a value greater than a predetermined allowable determination threshold to a value less than the allowable determination threshold.

8. The vehicle control system according to claim 7, wherein
the allowable determination threshold is increased with an increase in a maximum value of the jerk in the case where the jerk is greater than the limit determination threshold.

9. The vehicle control system according to claim 7, wherein
the control unit is configured to start changing the running characteristic after a lapse of a predetermined period of time from when the jerk decreases to the value less than the allowable determination threshold.

10. The vehicle control system according to claim 9, wherein
the predetermined period of time is set on the basis of a maximum value of the jerk in the case where the jerk is greater than the limit determination threshold.

11. The vehicle control system according to claim 7, wherein
the running characteristic includes any two or more of the driving force characteristic, the shift characteristic, the steering characteristic and the suspension characteristic of the vehicle, and
the allowable determination threshold is set for each of the characteristics included in the running characteristic.

12. The vehicle control system according to claim 9, wherein
the running characteristic includes any two or more of the driving force characteristic, the shift characteristic, the steering characteristic and the suspension characteristic of the vehicle, and
the predetermined period of time is set for each of the characteristics included in the running characteristic.

13. The vehicle control system according to claim 1, wherein
the control unit is configured to limit a change of the running characteristic by prohibiting a variation in the index.

14. The vehicle control system according to claim 1, wherein
the acceleration includes a resultant acceleration that combines a longitudinal acceleration in a longitudinal direction of the vehicle and a lateral acceleration in a lateral direction of the vehicle, and
the control unit is configured to prohibit a change of a predetermined characteristic by which driving force of the vehicle is changed in a cornering range in which a rate of the lateral acceleration of the resultant acceleration is greater than or equal to a rate of the longitudinal acceleration of the resultant acceleration.

15. The vehicle control system according to claim 1, wherein
the control unit is configured to, when a plurality of the characteristics included in the running characteristic are changed, change the characteristics at a time interval.

16. The vehicle control system according to claim 15, wherein
the control unit is configured to, when a plurality of the characteristics included in the running characteristic are changed, change the characteristics in order of a running characteristic having a higher control response with respect to a change of the running characteristic.

* * * * *